(12) United States Patent
Vaid

(10) Patent No.: US 7,565,303 B1
(45) Date of Patent: Jul. 21, 2009

(54) PRE-PAID AIRLINE TICKETS

(75) Inventor: Rahul R. Vaid, New York, NY (US)

(73) Assignee: TechVenture Associates, Inc., Richardson, TX (US)

( * ) Notice: Subject to any disclaimer, the term of this patent is extended or adjusted under 35 U.S.C. 154(b) by 777 days.

(21) Appl. No.: 09/409,242

(22) Filed: Sep. 30, 1999

Related U.S. Application Data

(60) Provisional application No. 60/150,994, filed on Aug. 27, 1999.

(51) Int. Cl.
*G06Q 10/00* (2006.01)

(52) U.S. Cl. .................................. 705/5; 705/26; 705/37

(58) Field of Classification Search .................. 705/5, 705/37, 26, 4
See application file for complete search history.

(56) References Cited

U.S. PATENT DOCUMENTS

| | | | |
|---|---|---|---|
| 4,775,936 A | 10/1988 | Jung | 705/5 |
| 4,845,625 A | 7/1989 | Stannard | 705/5 |
| 4,885,685 A | 12/1989 | Wolfberg et al. | 705/14 |
| 4,931,932 A | 6/1990 | Dalnekoff et al. | 705/5 |
| 5,237,499 A | 8/1993 | Garback | 705/5 |
| 5,253,165 A | 10/1993 | Leiseca et al. | 705/5 |
| 5,270,921 A | 12/1993 | Hornick | 705/6 |
| 5,331,546 A | 7/1994 | Webber et al. | 705/6 |
| 5,483,444 A | 1/1996 | Heintzeman et al. | 705/5 |
| 5,511,114 A | 4/1996 | Stimson et al. | 379/114.16 |
| 5,546,446 A | 8/1996 | Tsunokawa et al. | 379/114.2 |
| 5,570,283 A | 10/1996 | Shoolery et al. | 705/5 |
| 5,577,109 A | 11/1996 | Stimson et al. | 379/114.2 |
| 5,760,381 A | 6/1998 | Stich et al. | 235/380 |
| 5,778,313 A | 7/1998 | Fougnies | 455/406 |
| 5,797,127 A | 8/1998 | Walker et al. | 705/5 |
| 5,897,620 A * | 4/1999 | Walker et al. | 705/5 |
| 5,923,734 A | 7/1999 | Taskett | 379/114.18 |
| 5,953,705 A * | 9/1999 | Oneda | 705/5 |
| 6,134,309 A * | 10/2000 | Carson | 379/114.2 |

OTHER PUBLICATIONS

Wall Street Journal, Jan. 6, 1998; Hawaiian Air to Offer Tickets Through ATMs, p. 6.*
Screen Shots from the following websites. Other web pages are available at these domains. These pages are not included pursuant to 37 CFR 1.98(c), because they are merely cumulative of the references attached hereto: http://www:priceline.com; cheaptickets.com; travelocity.com; biztravel.com; expedia.com; tix.com; travel.yahoo.com; bid4travel.com; ebay.com.

* cited by examiner

*Primary Examiner*—Robert W Morgan
(74) *Attorney, Agent, or Firm*—Fish & Richardson P.C.

(57) ABSTRACT

The invention is a pre-paid airline ticket comprising a record of an advance-purchase of an airline ticket for a fixed price that may be used by a customer to reserve and book a flight. The pre-paid airline ticket includes a unique identifier and, associated with the identifier, a plurality of geographic flight parameters and a plurality of non-geographic flight parameters. At least one of the plurality of geographic flight parameters is unspecified, as are possibly any of the non-geographic flight parameters, so that the customer may later convert the pre-paid airline ticket into a conventional airline ticket by specifying any unspecified parameters. The customers ability to do so is subject to any restrictions placed upon the pre-paid airline ticket by the unspecified parameters, and also to the availability of seats meeting the unspecified parameters. In other aspects the invention is a network server configured to sell pre-paid airline tickets, and a method of selling pre-paid airline tickets.

19 Claims, 24 Drawing Sheets

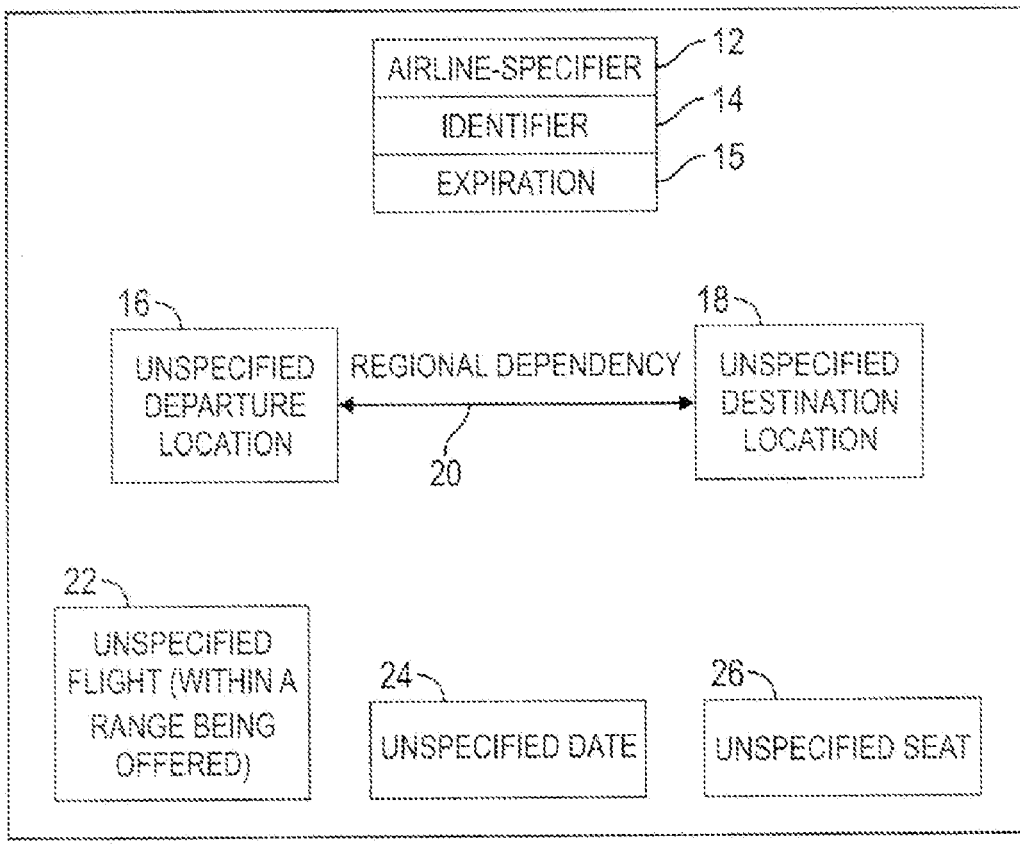

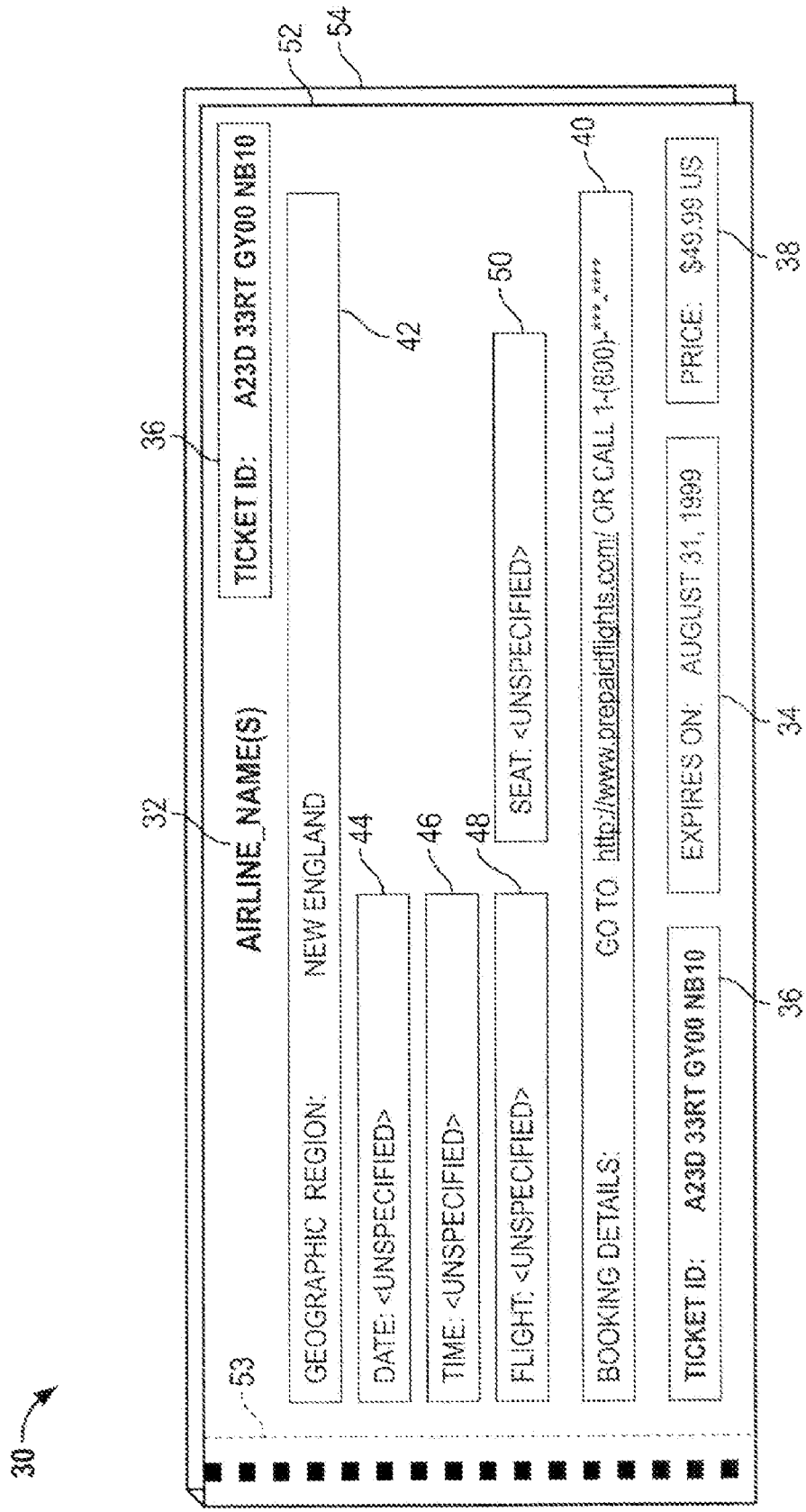

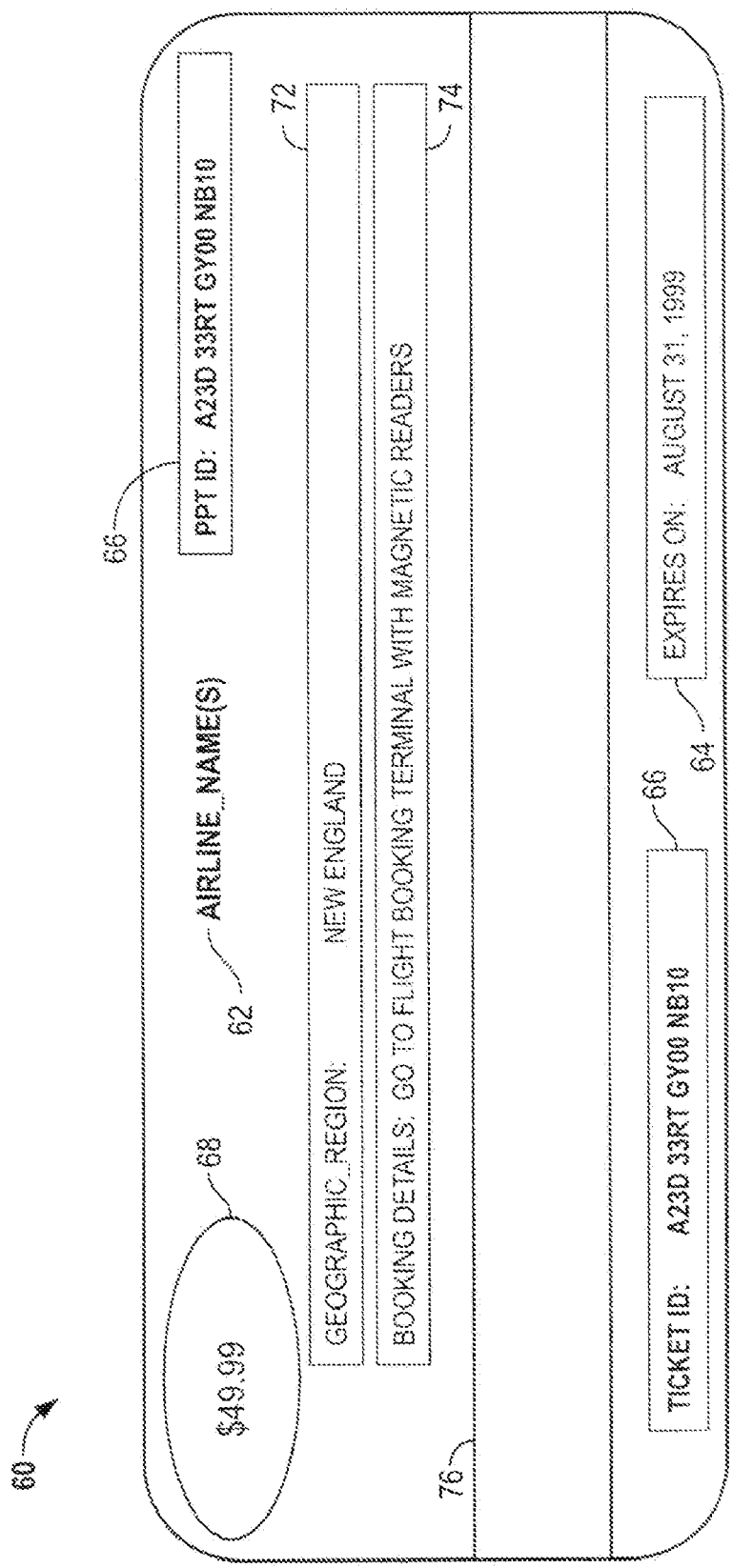

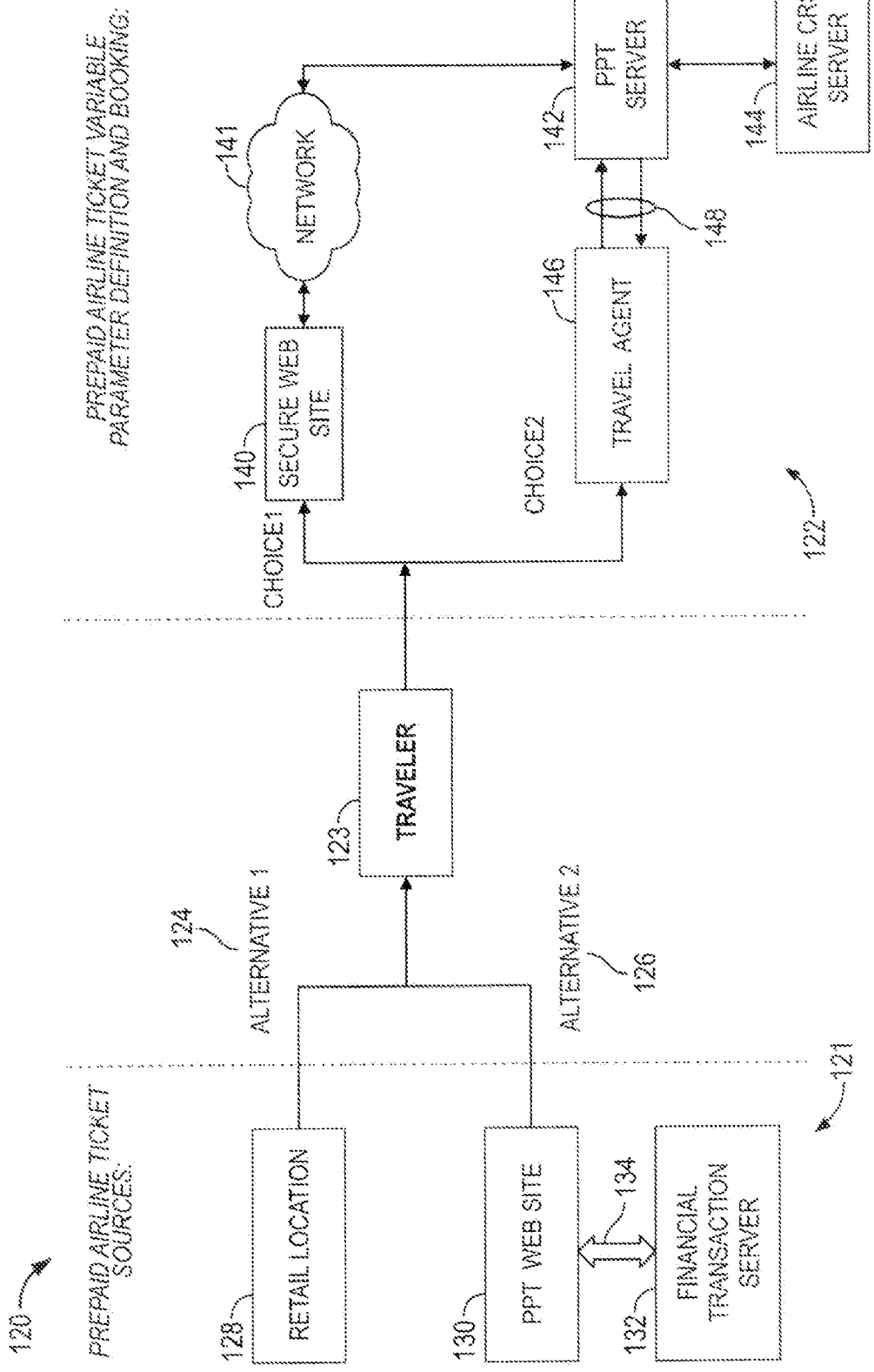

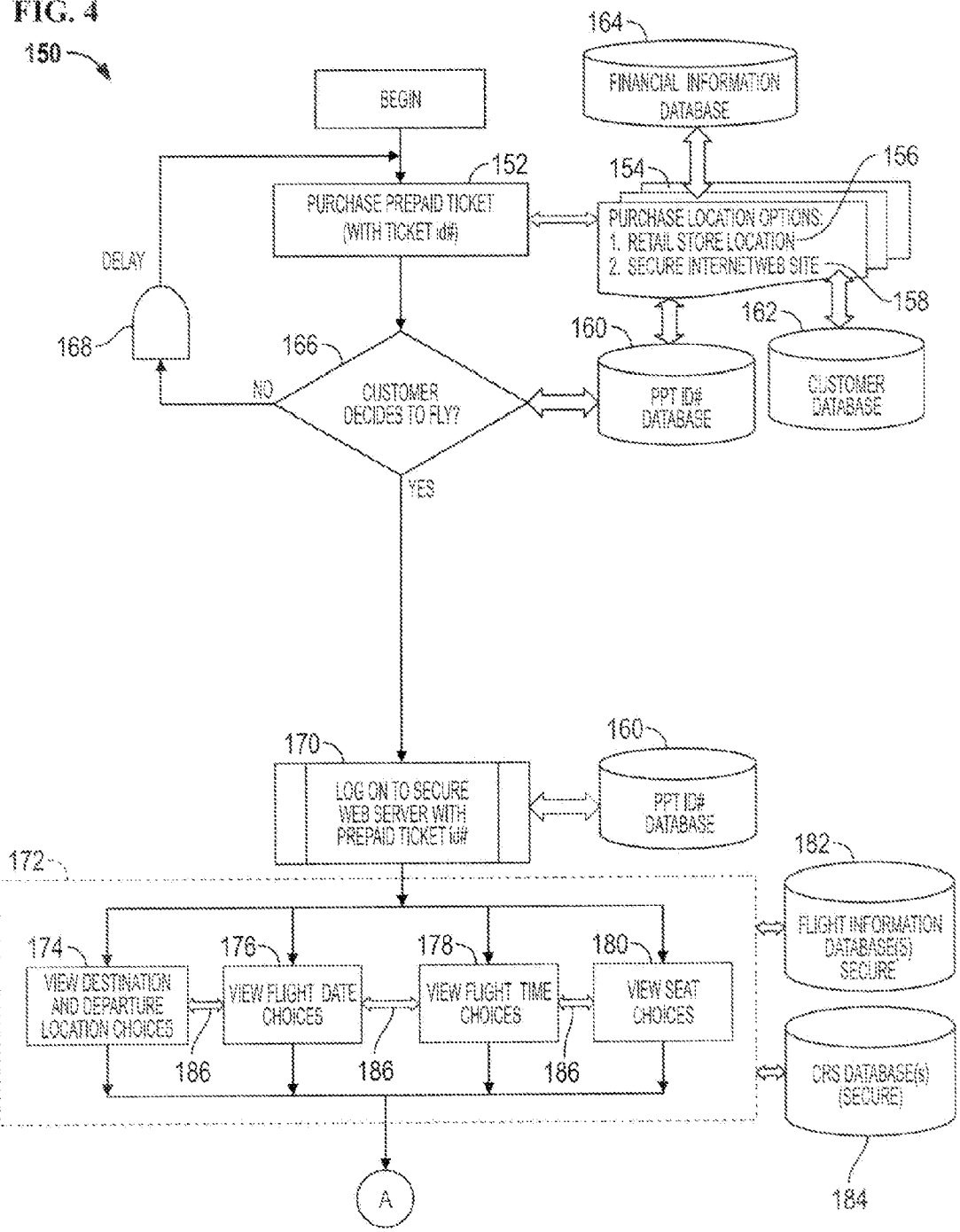

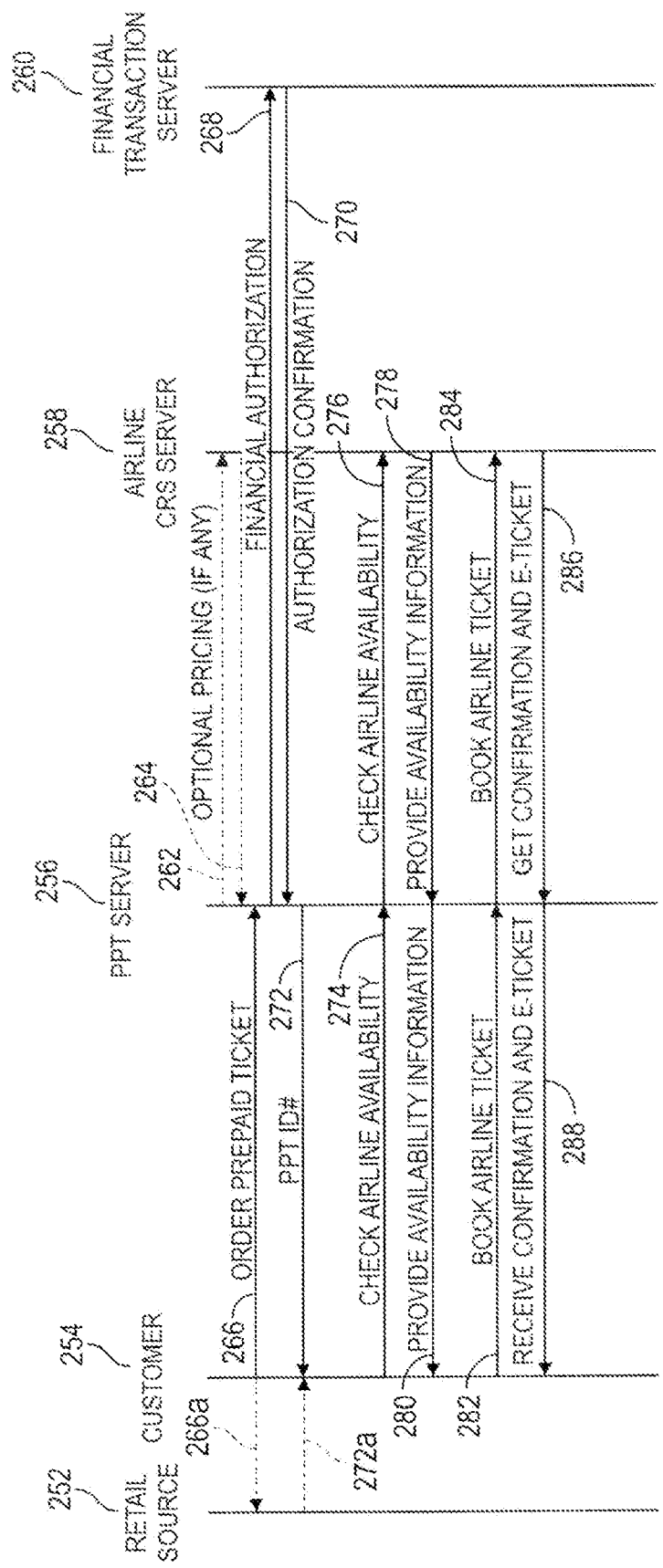

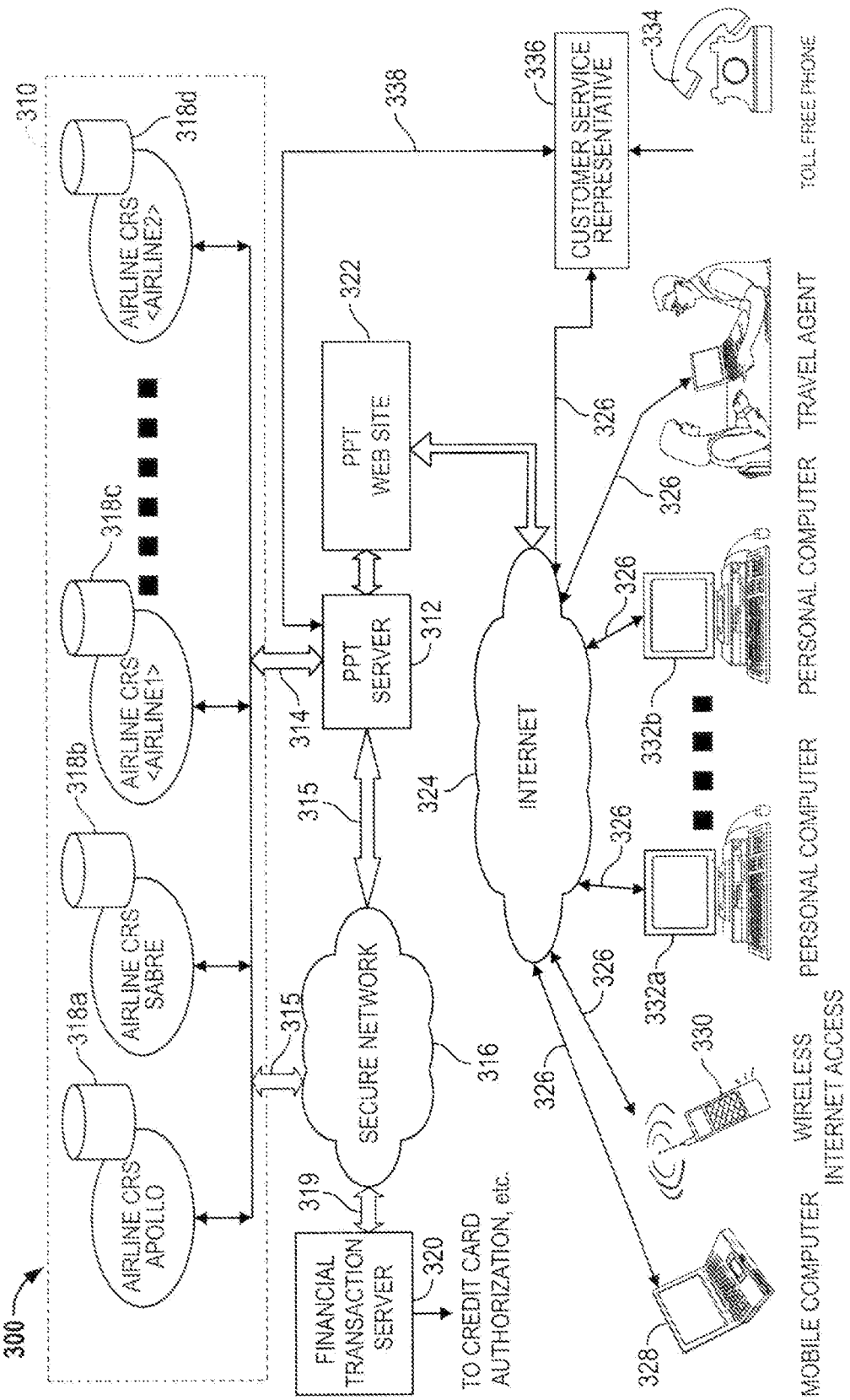

FIG. 8A ⟵ 410

| REGION 414 | PPT ID# 416 | ALLOWED DEPARTURES 418 | ALLOWED DESTINATIONS 420 | PARTICIPATING AIRLINES 422 | EXPIRATION DATE 424 | PRICE 426 | BOOKING DETAILS 428 | ISSUE DATE 430 | SALE DATE 432 | CUSTOMER ID 434 | RESTRICTIONS 435 | |
|---|---|---|---|---|---|---|---|---|---|---|---|---|
| NEW ENGLAND | AC20 30PT GY09 NB10 | MANCHESTER, NH; BOSTON, MA; NASHUA, NH; PORTLAND, NH; GREENFIELD, MA | MANCHESTER, NH; BOSTON, MA; NASHUA, NH; PORTLAND, NH; GREENFIELD, MA; PORTLAND, ME | DELTA, USAIR | 08/31/99 | $49.99 | http://www.prepaidflights.com/ or 1-800-*-** | 06/21/99 | 08/01/99 | J01 | none | ← 412a |
| TO NORTHEAST | RE20 30AR GY09 NB20 | * | NEW YORK, NY; MANCHESTER, NH; BOSTON, MA; NASHUA, NH; PORTLAND, NH; GREENFIELD, MA; PORTLAND, ME | DELTA, CONTINENTAL, UNITED | 09/20/99 | $59.99 | http://www.prepaidflights.com/ or 1-800-*-**** | 06/22/99 | UNSOLD | NA | SEAT: 23A-35E | ← 412b |
| 100 miles | K724 0034 SFCA GNYR | *** | *** | DELTA | 09/20/99 | $89.00 | http://www.prepaidflights.com/ or 1-800-*-** | 06/22/99 | UNSOLD | [ ] | TIME: 10:00 a.m.-2 p.m. | ← 412c |
| | | | | DELTA, CONTINENTAL, SOUTHWEST | 09/22/99 | $99.99 | http://www.prepaidflights.com/ or 1-800-*-** | 01/09/00 | UNSOLD | NA | DATE: 9/15/99, 9/22/99 | ← 412d |
| WEST COAST | AC20 30PT GY11 NB92 | SAN FRANCISCO, CA; LOS ANGELES, CA; SUNNYVALE, CA; SEATTLE, WA; SACRAMENTO, CA; LAS VEGAS, NE; SANTA BARBARA, CA; SANTA CLARA, CA | SAN FRANCISCO, CA; LOS ANGELES, CA; SUNNYVALE, CA; SEATTLE, WA; SACRAMENTO, CA; LAS VEGAS, NE; SANTA BARBARA, CA; SANTA CLARA, CA; PORTLAND, WA; SPOKANE, WA | | | | | | | | | |
| | | | | | | | | | | | | |

| CUSTOMER ID# 444 | PASSWORD FIELD 446 | CUSTOMER NAME 448 | ADDRESS 450 | CONTACT TELEPHONE 452 | CONTACT EMAIL 454 | DATE OF PURCHASE 456 | AIRLINE PREFERENCE 458 | SEAT PREFERENCE 460 | TIME PREFERENCE 470 | FREQUENT FLYER MILES 472 | COMMENTS 474 |
|---|---|---|---|---|---|---|---|---|---|---|---|
| c001 | ****** | JOE SCHMOE | 11 WALKER DRIVE, NY, 10000 | (212) 414-**** | JSCHMOE@ XYZ.COM | 12/28/99 | DELTA | AISLE | DAY | DELTA, USAIR | |
| c002 | ####### | JODY SCHMOEE | 12 WALKER DRIVE, NY, 10000 | (212) 366-**** | JSCHMOE@ XYZE.COM | 5/1/00 | USAIR | WINDOW | EVENING | USAIR, DELTA | |
| | | | | | | | | | | | |
| c258 | #$#$#$# | JUDY SCHOEI | 13 WALKER DRIVE, NY, 10000 | (212) 669-**** | JSCHMOE@ XYZMAIL. COM | 4/15/00 | CONTINENTAL | NONE | AM | UNITED, CONTINENTAL | |
| | | | | | | | | | | | |

| Customer ID# (484) | Password Field (486) | Customer Name (488) | Billing Address (490) | Contact Telephone (492) | Contact Email (494) | Date of Purchase (496) | CC Type (498) | Credit Card # (500) | CC Expiration Date (502) | CC2 Type (504) | Credit Card #2 (506) | CC Expiration Date2 (508) | Comments (510) |
|---|---|---|---|---|---|---|---|---|---|---|---|---|---|
| 0001 | ****** | Joe Schmoe | 11 Walker Drive, NY 10000 | (212) 414-**** | jschmoe@xyz.com | 12/22/98 | AMEX | 3782 **** 11** | 09/30/99 | MC | 5424 3400 **** 21** | 02/28/99 | --- |
| 0002 | ******* | Jody Schmoee | 12 Walker Drive, NY 10000 | (212) 385-**** | jschmoee@xyz.com | 3/1/00 | MC | 5424 3400 **** 21** | 02/28/00 | VISA | 2312 **** 77*** | 12/22/99 | --- |
| | | | | | | | | | | | | | |
| 0285 | ****** | Judy Schmoed | 13 Walker Drive, NY 10000 | (212) 555-**** | jschmoed@xyzmail.com | 4/8/00 | VISA | 2312 **** 77*** | 02/28/99 | MC | 5424 3400 **** 21** | 02/28/99 | |
| | | | | | | | | | | | | | |
| | | | | | | | | | | | | | |

480 ↗

482 (brace covering rows)

FIG. 8D

| FLIGHT NUMBER | DEPARTURE/ DESTINATION AIRPORT | AIRLINE | CLASS | LIST PRICE | CATEGORY PRICE | PASSENGER NAME RECORD |
|---|---|---|---|---|---|---|
| DA223 | (BOS) - (MAN) | DELTA | ECON | $125.00 | $49.99 | xxxx xxxx |
| A1234 | (JFK) - (BOS) | AMERICAN | BC | $225.00 | $99.99 | xxxx xxxx |
| [...] | [...] | [...] | [...] | [...] | [...] | [...] |
| LM4456 | (LAX) - (SET) | UNITED | ECON | $399.00 | $99.99 | xxxx xxxx |
| [...] | [...] | [...] | [...] | [...] | [...] | [...] |
| [...] | [...] | [...] | [...] | [...] | [...] | [...] |

FIG. 8E

| DEPARTURE AIRPORT 544 | DESTINATION AIRPORT 546 | DATE 548 | DEPARTURE TIME 550 | ARRIVAL TIME 552 | AIRLINE 554 | FLIGHT # 556 | VIA 558 |
|---|---|---|---|---|---|---|---|
| BOSTON, MA (BOS) | MANCHESTER, NH (MAN) | 8/22/99 | 9:00 AM EST | 10:00 AM EST | DELTA | DA223 | NON-STOP |
| NEW YORK, NY (JFK) | LOS ANGELES, CA (LAX) | 9/2/99 | 10:30 AM EST | 2:00 PM PST | AMERICAN | AZ440 | ONE-STOP |
| [...] | [...] | [...] | [...] | [...] | [...] | 01/00/00 | [...] |
| LOS ANGELES, CA (LAX) | SEATTLE, WA (SET) | 8/25/99 | 4:00 PM PST | 6:00 PM PST | AMERICAN | AM221 | NON-STOP |
| [...] | [...] | [...] | [...] | [...] | [...] | [...] | [...] |
| [...] | [...] | [...] | [...] | [...] | [...] | [...] | [...] |

| FLIGHT # | DEPARTURE DATE | REMAINING ECON SEATS | REMAINING BC SEATS | TOTAL BOOKED |
|---|---|---|---|---|
| DA223 | 8/22/99 | 21 | 20 | 321 |
| AZ440 | 9/2/99 | 11 | 40 | 200 |
| [...] | [...] | [...] | [...] | [...] |
| AM221 | 8/25/99 | 32 | 12 | 211 |
| [...] | [...] | | | [...] |
| [...] | [...] | | | [...] |

564 — FLIGHT #
566 — DEPARTURE DATE
568 — REMAINING ECON SEATS
570 — REMAINING BC SEATS
572 — TOTAL BOOKED
562

FIG. 8G 580

| FLIGHT # | DEPARTURE DATE | ECON RESTRICTION | BC RESTRICTIONS | COMMENTS |
|---|---|---|---|---|
| DA223 | 8/22/99 | NON STOP | NON STOP | ......... |
| AZ440 | 9/2/99 | ONE STOP | ONE STOP | ......... |
| [...] | [...] | [...] | [...] | ......... |
| AM221 | 8/25/99 | NON STOP | NON STOP | ......... |
| [...] | [...] | | | [...] |
| [...] | [...] | | | [...] |

584 — FLIGHT #
586 — DEPARTURE DATE
588 — ECON RESTRICTION
590 — BC RESTRICTIONS
592 — COMMENTS
582

PRE-PAID AIRLINE TICKETS

CROSS-REFERENCE TO RELATED APPLICATIONS

This application claims the benefit of U.S. Provisional Application No. 60/150,994, filed on Aug. 27, 1999. The disclosure of that application is incorporated herein by reference.

BACKGROUND OF THE INVENTION

1. Field of the Invention

This application relates to the field of airline tickets and more particularly to the sale of pre-paid airline tickets.

2. Description of Related Art

Commercial airlines generally seek to optimize their per-flight revenues by pricing available seats in a multi-tiered system that provides discount incentives to advance planners, who have more flexibility, while charging a full fare to customers who must fly specific routes on short notice, e.g., the typical business traveler. By using historical data, the airlines are able to determine well in advance which of their offered routes will have empty seats. They can also estimate, with varying degrees of accuracy, which times of the day, week, and month will be the busiest for each route. However, the airlines are restricted in their ability to offer reduced rates for anticipated open-capacity routes, since any advertised reductions can compromise revenues from full-fare passengers and lead to price reductions by competitors.

The potential air traveler has a different set of competing interests. The traveler would like to obtain a low price for a ticket, an objective which is satisfied by airlines that offer reduced fares for early commitments. However, these "restricted" tickets force a traveler to commit early to a particular flight, with hefty financial penalties for subsequent changes. Many travelers would prefer to retain some scheduling flexibility, and airlines provide "open" tickets to meet this need. However, these tickets are expensive and hence undesirable to most travelers. Thus, the presently available options for air travelers can provide flexibility, but only at a significant monetary premium.

One approach to resolving the tension between the airlines' interests and the travelers' interests is presented in U.S. Pat. No. 5,897,620, entitled "Method and Apparatus for the Sale of Airline-Specified Flight Tickets." This patent describes a system in which a traveler provides flight and price information, and an airline chooses a specific flight meeting the traveler's criteria. This may permit a traveler to meet price objectives without substantial advance planning. However, as a significant disadvantage, the traveler is then forced to accept whatever flight and seat the airline offers.

There remains a need for an airline ticket selling system that addresses a traveler's dueling interests in price and flexibility. The system should meet travelers' needs without unduly upsetting an airline's multi-tiered fare structure.

SUMMARY OF THE INVENTION

The invention is a pre-paid airline ticket comprising a record of an advance-purchase of an airline ticket for a fixed price that may be used by a customer to book a flight, the pre-paid airline ticket including an identifier, the identifier uniquely identifying the pre-paid airline ticket, and, associated with the identifier, a plurality of geographic flight parameters and a plurality of non-geographic flight parameters, at least one of the plurality of geographic flight parameters being an unspecified geographic flight parameter.

In one aspect, the identifier comprises an alpha-numeric sequence. In another aspect, the plurality of non-geographic flight parameters comprise a date, a time, a flight number, and a seat. The plurality of non-geographic flight parameters may further comprise one or more unspecified non-geographic flight parameters. The one or more unspecified non-geographic flight parameters may comprise a range of possible values from which the one or more unspecified non-geographic flight parameters may be selected. In another aspect, the plurality of geographic flight parameters comprise a departure location and a destination. In another aspect, the pre-paid airline ticket includes a dependence between two or more of the plurality of geographic flight parameters. The dependence may comprises a maximum distance between the destination and the departure location. The dependence may comprise a geographical region from which the departure location and the destination must be selected. The dependence may comprise a geographical region from which the departure location must be selected for a specified destination. The dependence may comprise a geographical region from which the destination must be selected for a specified departure location.

In one aspect, the pre-paid airline ticket comprises a wallet-sized card, the wallet-sized card including a magnetic strip, the magnetic strip comprising an encoded representation of the unique identifier. In another aspect, the pre-paid airline ticket comprises a wallet-sized card, the wallet-sized card including a bar code, the bar code comprising an encoded representation of the unique identifier. In yet another aspect, the pre-paid airline ticket comprises a printed receipt, the printed receipt including a first part for presentation to an airline and a second part for a customer's records, the printed receipt including, in printed form, the unique identifier, the plurality of non-geographic flight parameters, and the plurality of geographic flight parameters. In another aspect, the pre-paid airline ticket comprises an electronic receipt, the electronic receipt including, in electronic form, the unique identifier. In another aspect, the pre-paid airline ticket of claim 1 further comprises an email receipt, the email receipt including, in electronic form, the unique identifier.

In a different aspect, the invention is a network server for selling pre-paid airline tickets, the server comprising: a processor and a storage device, the storage device configured to store one or more ticket options, each ticket option comprising an identifier, the identifier uniquely identifying the ticket option, a price, a plurality of geographic flight parameters, and a plurality of non-geographic flight parameters, at least one of the plurality of geographic flight parameters being an unspecified geographic flight parameter; a secure connection to one or more customers, wherein the processor is connected in a communicating relationship with one or more customers, the processor configured to provide an interactive user interface to the one or more customers, the interface including a presentation of the one or more ticket options, the processor further configured to receive an order from one of the one or more customers for a particular one of the one or more ticket options; and the processor further configured to provide the identifier of the particular one of the one or more ticket options to the one the one or more customers when that customer orders a pre-paid airline ticket.

The network server may further comprise a secure connection to one or more airline servers, wherein the processor is connected in a communicating relationship with the one or more airline servers, the processor configured to retrieve new ticket options from the one or more airline servers and store the new ticket options in the storage device. The processor may be configured to retrieve new ticket options from the one or more airline servers on a real-time basis. The network server may further comprise a secure connection to one or more financial transaction servers, wherein the processor is connected in a communicating relationship with the one or more financial transaction servers, the processor configured to complete a financial transaction through one of the one or more financial transaction servers for one of the one or more customers when that customer orders a pre-paid airline ticket.

In another aspect, the network server may further comprise a secure connection to one or more remote ticket vendors, wherein the processor is connected in a communicating relationship with the one or more remote vendors, the processor configured to provide each of the remote vendors with one or more ticket options, whereby each of the remote vendors may resell one or more pre-paid airline tickets. The network server may be a World Wide Web server. The secure connection to one or more customers may further comprise a secure Internet connection. In another aspect, the processor is further configured to receive a unique identifier from a pre-paid ticket holder, present qualifying flight and seat information to the pre-paid ticket holder, receive a booking request from the pre-paid ticket holder, and provide a booking confirmation to the pre-paid ticket holder. The processor may also be configured to obtain seat availability information from an airline server and to provide the seat availability information to a pre-paid ticket holder. The storage device may comprise a mass storage device. The processor may be further configured to provide an electronic bulletin board for reselling a plurality of pre-paid airline tickets.

In a different aspect, the invention is a system for providing pre-paid airline tickets comprising: means for storing a plurality of ticket options, each ticket option comprising a ticket price, a plurality of geographic flight parameters, and a plurality of non-geographic flight parameters, at least one of the plurality of geographic flight parameters being an unspecified geographic flight parameter; means for presenting the plurality of ticket options to a customer; means for receiving a ticket selection from the customer; means for receiving a payment from the customer, the payment being equal to the ticket price; means for associating with the selected ticket option a unique identifier; means for storing the unique identifier and the associated ticket option; and means for providing a pre-paid airline ticket to the customer, the pre-paid airline ticket comprising a record of the unique identifier.

In one aspect, the system further comprises means for booking a flight using the pre-paid airline ticket. In another aspect, the flight booking means further comprises a means for interactively booking a flight over the World Wide Web. In another aspect, the system further comprises a means for periodically updating the ticket option storing means from a remote airline server. In another aspect, the system further comprises a means for securely communicating with a remote financial transaction server to perform a transfer of funds for the customer. In yet another aspect, the system further comprises a means for reselling a plurality of pre-paid airline tickets.

In a different aspect, the invention is a method for providing pre-paid airline tickets comprising: storing a plurality of ticket options in a ticket option database, each ticket option comprising a ticket price and a plurality of flight parameters, at least one of the plurality of flight parameters being an unspecified flight parameter; presenting the ticket options to a customer; receiving a ticket selection from the customer; receiving a payment from the customer, the payment being equal to the ticket price; associating a unique identifier with the selected ticket option; storing the unique identifier and the associated ticket option; and providing a pre-paid airline ticket to the customer, the pre-paid airline ticket comprising a record of the unique identifier and a record of one or more of the plurality of flight parameters.

In another aspect the method further comprises booking a flight using the pre-paid airline ticket. In another aspect, booking a flight is performed interactively using the World Wide Web. In another aspect, the method further comprises periodically updating the ticket option database from a remote airline server. In another aspect, receiving a payment from the customer further comprises transferring funds for the customer using a remote financial transaction server. In another aspect, providing a pre-paid airline ticket further comprises generating a wallet-sized card with the unique identifier encoded in a magnetic strip. In another aspect, providing a pre-paid airline ticket further comprises generating a wallet-sized card with the unique identifier encoded in a bar code. In another aspect, providing a pre-paid airline ticket further comprises generating a printed receipt, the printed receipt including a first part for presentation to an airline and a second part for the customer's records, the printed receipt including, in printed form, the unique identifier and the plurality of flight parameters. In another aspect, a plurality of pre-paid airline tickets are provided to a wholesale customer, the wholesale customer further reselling one or more of the pre-paid airline tickets to a retail customer. In yet another aspect, the method further comprises providing an electronic bulletin board where a plurality of customers resell pre-paid airline tickets.

In a different aspect, the invention is a computer program embodied on a computer-readable medium for providing pre-paid airline tickets using a pre-paid ticket identifier database, the database comprising a plurality of records, each record including a plurality of fields, the plurality of fields comprising: an identifier field, the identifier field including an identifier that uniquely identifies a pre-paid airline ticket, a plurality of geographic flight parameter fields, and a plurality of non-geographic flight parameter fields, at least one of the plurality of geographic flight parameter fields including an unspecified geographic flight parameter.

The identifier included in the identifier field may comprises an alpha-numeric sequence. The plurality of non-geographic flight parameter fields may include a restrictions field, the restrictions field including any restrictions on use of an associated pre-paid airline ticket. The unspecified geographic flight parameter may comprise a plurality of choices from which the unspecified geographic flight parameter may be specified. The plurality of geographic flight parameter fields may include an allowed destinations field and an allowed departures field. The plurality of geographic flight parameter fields may also include a region field, the region field providing information which establishes a dependence between an allowed destinations field and an allowed departures field.

BRIEF DESCRIPTION OF DRAWINGS

The foregoing and other objects and advantages of the invention will be appreciated more fully from the following further description thereof, with reference to the accompanying drawings, wherein:

FIG. 1 is a diagram of the characteristics of a pre-paid airline ticket according to the invention;

FIG. 2A shows a printed pre-paid airline ticket;

FIG. 2B shows a pre-paid airline ticket card;

FIG. 3 is an abstract diagram of a system for selling pre-paid airline tickets;

FIG. 5 is an information flow chart describing a customer process of purchasing a pre-paid airline ticket;

FIG. 6 is a diagram of communication links among components of a system for selling and using pre-paid airline tickets;

FIG. 8A illustrates records in a pre-paid airline ticket identifier database;

FIG. 8B illustrates records in a customer database;

FIG. 8C illustrates records in a financial information database;

FIG. 8D illustrates records in a reservations database;

FIG. 8E illustrates records in a flight schedule database;

FIG. 8F illustrates records in a seat allocation database;

FIG. 8G illustrates records in a restrictions database;

FIG. 9A shows a World Wide Web selection page;

DETAILED DESCRIPTION OF THE PREFERRED EMBODIMENT(S)

Figure 2C:
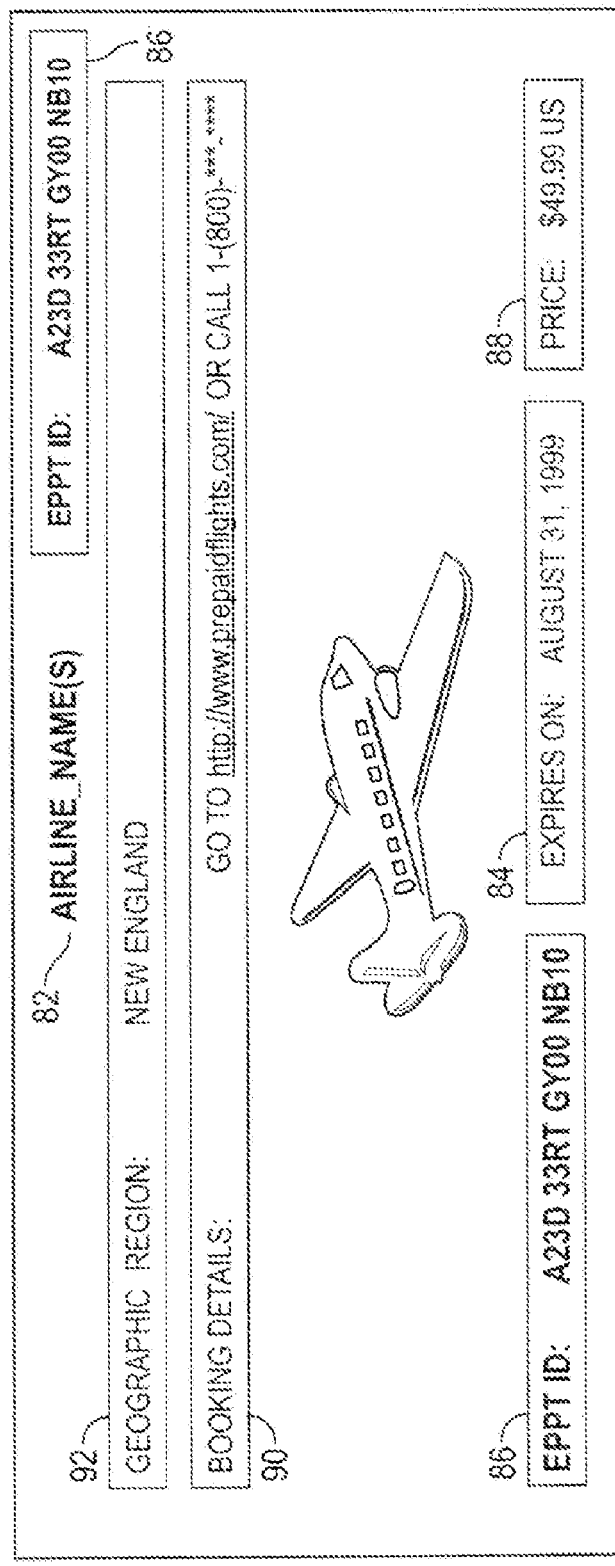
FIG. 2C shows a downloadable electronic pre-paid airline ticket.

To provide an overall understanding of the invention, certain illustrative embodiments will now be described, including several pre-paid airline tickets and a system and method for selling same. However, it will be understood by those of ordinary skill in the art that the ticket may be adapted to other physical forms, provided they are capable of including the pre-paid ticket identification number described below. It will also be understood that the methods and systems described herein can be suitably adapted to any other sales model where a customer can make an advance purchase while leaving one or more details of the purchase unspecified, such as, for example, with a car rental, a luxury cruise, or a package vacation. The terms "traveler", "purchaser", "customer", and user are used interchangeably herein to denote a potential traveler who purchases, or may purchase, a ticket for air travel.

FIG. 1 shows a number of characteristics of a pre-paid airline ticket ("PPT") 10 according to the invention. The characteristics of the PPT 10 include an airline specifier 12 that specifies one or more commercial airlines that will honor the PPT 10. The PPT 10 also includes an identifier 14 that uniquely identifies a particular PPT, and an expiration date 15 that denotes a date on which the PPT 10 will expire if it is not used. The airline specifier 12, the identifier 14, and the expiration date 15 are all fixed at the time that the PPT 10 is purchased. The identifier 14 is preferably an alpha-numeric sequence, but it may also contain other human-readable characters, a bar code, a computer-readable bit or byte code, or any other form of identification, provided the identifier can carry sufficient information to uniquely identify a specific ticket from among all outstanding tickets, and preferably sufficient information to provide a measure of security against misappropriation of the identifier 14.

The PPT 10 includes a number of flight parameters relating to particular flights offered by airlines. Any or all of these parameters may be unspecified, that is, the parameters may be specified by a purchaser after the PPT 10 is purchased. Such possible unspecified parameters include an unspecified departure location 16 and an unspecified destination 18. It is specifically intended that these geographic parameters will have a dependency 20 inter-relating them. This may be, for example, a requirement that the unspecified departure location 16 and the unspecified destination 18 may not be chosen more than a certain distance apart. In this case, selecting a specific departure location will accordingly limit possible destinations to those within the prescribed distance limit. Alternatively, the dependency 20 may require that both geographic parameters be selected from a specific geographic region, or prohibit selecting the unspecified departure location 16 and the unspecified destination 18 from different regions. Typical geographic regions include generic designations such as the Northeast or Southwest, and some named regions such as New England. Thus the PPT 10 represents a traveler's entitlement to specify, at a future date, a particular flight and seat satisfying any restrictions or range limitations on the unspecified parameters.

While it is specifically contemplated that the geographic parameters will be unspecified, other non-geographic parameters may be unspecified instead of, or in addition to, the geographic parameters. For example, there may be an unspecified flight 22, which can be restricted to a range of flights (and associated flight times). For example, the PPT 10 may be restricted to flights departing before 8:00 a.m., or between 11:00 a.m. and 2:00 p.m. Or the PPT 10 may be restricted to one or more specific flight numbers. The PPT 10 may also contain an unspecified date 24 which may be a specific calendar date, a range of dates, or a particular day of the week. For example, the PPT 10 may be restricted to all Tuesdays through Thursdays until the expiration date, or to all dates between February 1 and February 15. The PPT 10 may also include an unspecified seat 26. In fact, the actual seat number would typically be reserved until the time of flight booking. However, restricting the seat to a specific range of seats will permit airlines to conveniently guarantee a number of other seats for full-fare travelers.

FIG. 2A shows a printed pre-paid airline ticket 30 that includes the characteristics and parameters of the PPT 10 described above. In particular, the printed PPT 30 includes an airline name 32, an expiration date 34, and an identifier 36 that appears in the upper-right and lower-left corners of the printed PPT 30. A price 38 appears in the lower-right corner, the price 38 indicating the fixed, up-front price paid by a traveler for the printed PPT 30. The printed PPT 30 includes booking details 40 which describe resources, e.g., a World-Wide Web ("web") site or telephone number, that the traveler can use to book a flight. The printed PPT 30 includes a geographic region 42 for which the printed PPT 30 may be used, which may alternatively include a distance or other limitation as described above. Other unspecified parameters are detailed on the printed PPT 30, including a date 44, a time 46, a flight number 48, and a seat 50. If one of these unspecified parameters has further restrictions with respect to the printed PPT 30 and the associated identifier 36, these restrictions will appear next to the parameter.

The printed PPT 30 includes a top sheet 52 comprising an airline copy of the information associated with the printed PPT 30, and a bottom sheet 54 comprising a customer copy of the information. Thus the printed PPT 30 may be used in the same manner as a conventional airline ticket, with the top sheet 52 being detachable along a row of perforations 53 so that it may be presented to the airline before boarding, and the bottom sheet 54 being retained by a traveler or used as a boarding pass.

FIG. 2B shows a pre-paid airline ticket card 60 that includes the characteristics and parameters of the PPT 10 described above. The PPT card 60 includes an airline name 62, an expiration date 64, and an identifier 66 that appears in the upper-right and lower-left corners of the PPT card 60. A price 68 appears in the upper-left corner, the price 68 indicating the fixed, up-front price paid by a traveler for the PPT card 60. The PPT card 60 includes booking details 70 which describe resources, e.g., a flight booking terminal with magnetic readers, that the traveler can use to book a flight. The PPT card 60 also includes a geographic region 72 like the geographic region 42 of the printed PPT 30. The PPT card 60 also includes booking details 74, such as instructions to go to a flight booking terminal. The identifier 66 and the geographic region 72, along with any other unspecified parameters and restrictions, are encoded into a magnetic strip 76. It is specifically contemplated that the PPT card 60 will be used in conjunction with a flight booking terminal that has a magnetic card reader, so that the purchaser may simply swipe the card through the reader and interactively select a flight and seat. Of course, nothing will prevent a bearer of the PPT card 60 from simply using the identifier 66 to conduct a PPT transaction though some other medium. The PPT card 60, like the printed PPT 30, is effectively a bearer instrument, and it is the identifier 66 itself that provides the entitlement to obtain passage on an airline.

FIG. 2C shows a downloadable electronic pre-paid airline ticket 80 that includes the characteristics and parameters of the PPT 10 described above. The electronic PPT 80 is displayed on, and printed from, a web page. The electronic PPT 80 includes an airline name 82, an expiration date 84, and an identifier 86 that appears in the upper-right and lower-left corners of the electronic PPT 80. A price 88 appears in the lower-right corner, the price 88 indicating the fixed, up-front price paid by a traveler for the electronic PPT card 80. The electronic PPT 80 includes booking details 90 which describe resources, e.g., a web site or telephone number, that the traveler can use to book a flight. The electronic PPT 80 also includes a geographic region 92 like the geographic region 42 of the printed PPT 30. The identifier 66 and the geographic region 72, along with any other unspecified parameters and restrictions associated with the electronic PPT 80, are stored in a remote database which is described below. It is specifically contemplated that the electronic PPT 80 will be used in conjunction with a PPT web server, however, booking may also be accomplished through other channels, such as a traditional travel agent.

Figure 2D:
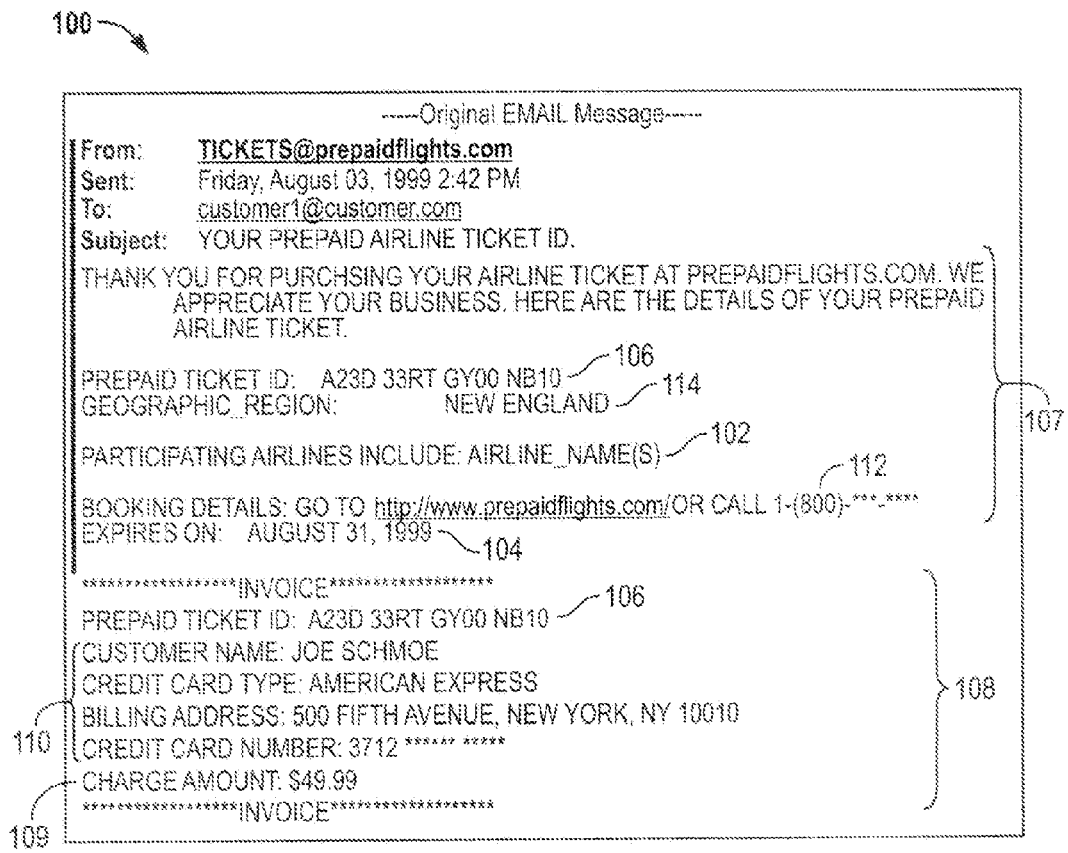
FIG. 2D shows an e-mail pre-paid airline ticket.

FIG. 2D shows an e-mail PPT 100 that includes the characteristics and parameters of the PPT 10 described above. The e-mail PPT 100 is received as conventional electronic mail from a (mail server on a) PPT web server, as will be described below. The e-mail PPT 100 includes an airline name 102, an expiration date 104, and an identifier 106 that appears in a message section 107 and an invoice section 108 of the e-mail PPT 100. A price 109 appears in the invoice section 108, along with customer data 110, indicating the fixed, up-front price paid by a traveler for the e-mail PPT 100. The e-mail PPT 100 includes booking details 112 which describe resources, e.g., a web site or telephone number, that the traveler can use to book a flight. The e-mail PPT 100 also includes a geographic region 114 like the geographic region 42 of the printed PPT 30. The identifier 106 and the geographic region 114, along with any other unspecified parameters and restrictions associated with the e-mail PPT 100, are stored in a remote database which is described below. It is specifically contemplated that the e-mail PPT 100 will be used in conjunction with a PPT web server, however, booking may also be accomplished through other channels, such as a traditional travel agent.

FIG. 3 is an abstract diagram of a system for selling pre-paid airline tickets 120. The system 120 includes sources 121 for PPT's 10, and outlets 122 through which a traveler 123 can use a PPT 10 to book a particular flight. As shown, the traveler 123 has a first alternative 124 and a second alternative 126 for obtaining a PPT 10. The first alternative 124 generally comprises physical or retail locations 128. Retail locations 128 may include any physical retail source, such as a PPT vending machine or a card stand at a convenience store. The second alternative 126 comprises a PPT web site 130, which communicates with a financial transaction server 132 through a secure connection 134 to complete purchase transactions. The PPT web site 130 is operated by a web server, and provides an interface through which Internet and other network customers can view available PPT's 10, enter selections, and provide data for financial transaction authorization and completion.

The traveler 123 also has several choices of how to use the PPT 10 to book a flight. The traveler 123 may access a secure web site 140 using the Internet or a network. The secure web site 140 may be the same as the PPT web site 130 from which the traveler 123 purchased the PPT 10. The secure web site 140 communicates through a network 141 with a PPT server 142. The secure web site 140 here represents a local rendition of a web site as viewed by the traveler 123 through an appropriate network device. The PPT server 142 provides any source code, graphics, etc., required to present the secure web site 140 to the traveler 123. The PPT server 142 is, in turn, in secure communication with one or more airline central reservation system ("CRS") servers 144. Using the secure web site 140, the traveler 123 may present a PPT 10 to the PPT server 142, which reviews any associated restrictions and accesses the airline CRS servers 144 to obtain qualifying flights and seats. These are then presented to the traveler 123 through the secure web site 140, where the traveler may select and book a specific itinerary.

As further shown in FIG. 3, the traveler may also approach a convention travel agent 146, who may then assist the traveler 123 in selecting a flight using information available through the PPT server 142. The travel agent 146 uses a bi-directional communication link 148 between the agent 146 (via computer) and the PPT server 142. The bi-directional communication link 148 may be an Internet link, a secure Internet link, another secure network link, or it may be a circuit-switched telecommunication link through, for example the public switched telephone network, to a dial-in service provided by the PPT server 142. The bi-directional communication link 148 may also be some combination of different types of links.

Figure 4:
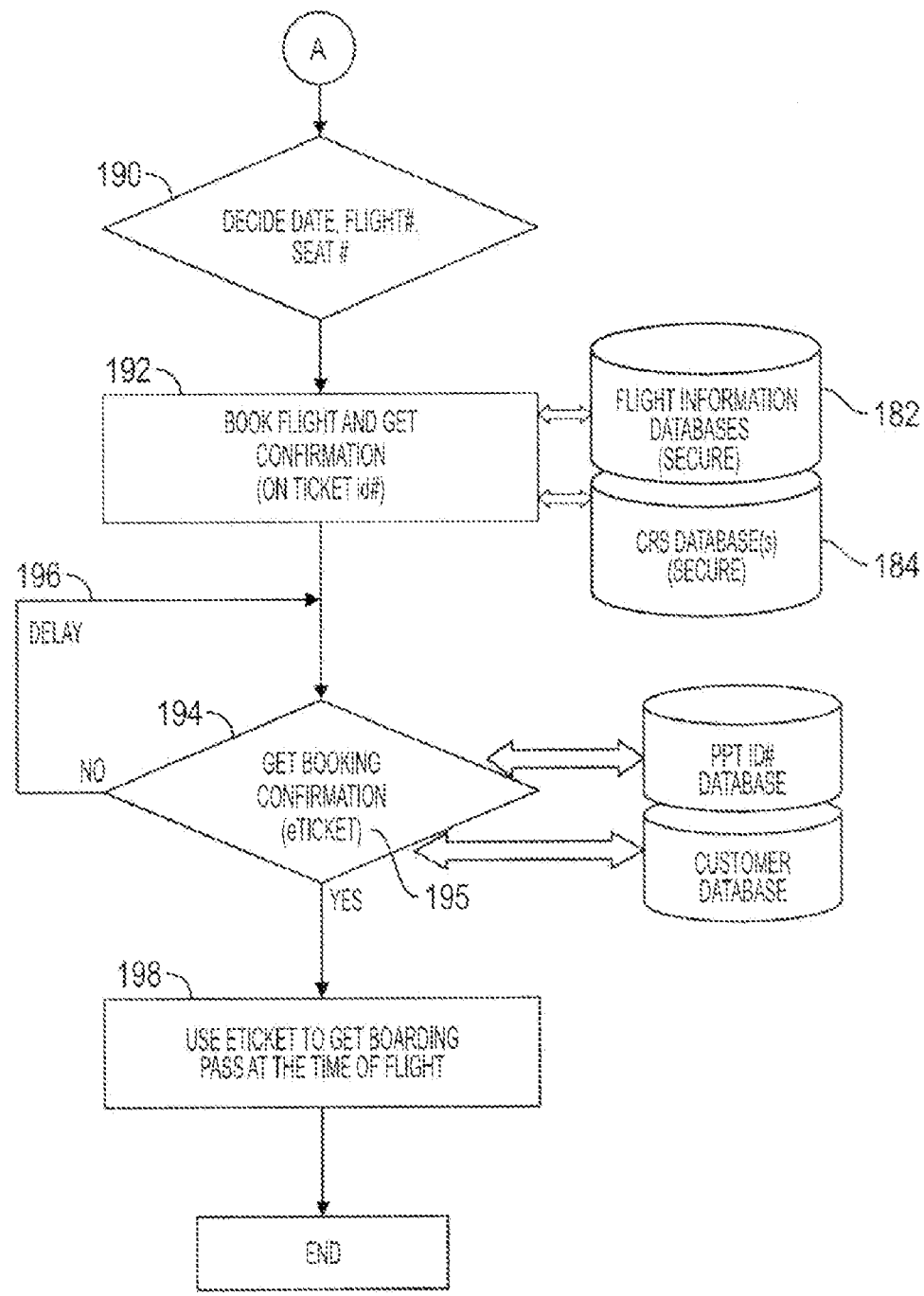
FIG. 4 is a flow chart of a customer process of purchasing a pre-paid airline ticket.

FIG. 4 is a flow chart of a customer process of purchasing a pre-paid airline ticket 150, which also shows resources used for each step. The process 150 begins with a purchase 152 of a PPT 10. As mentioned above, this entails two options 154, a purchase at a retail store 156 or a purchase through a secure web site 158. In the case of purchase through a web site 158, the sale is transacted in communication with a PPT identifier database 160 that stores identifiers and association characteristics and parameters, and in communication with a customer database 162 that stores supplemental data associated with customers, along with their associated identifier(s). A financial information database 164 may also be maintained to store (encrypted) financial data concerning customers. In the case of purchase at a retail store 156, any data to be associated with an identifier has already been generated and stored in the appropriate databases. In the next step 166, a customer must decide whether to fly. If the customer does not decide to fly within a delay 168 specified by an expiration date for the PPT 10. Then the customer must return to step 152 and purchase another PPT 10.

In step 170, the customer logs onto a secure web server using the identifier from the PPT 10. In will be appreciated that customer may alternatively approach a conventional travel agent, or proceed with an operator-assisted booking on a telephone. The PPT identifier database 160 confirms the identifier, and any associated information in the customer database 162 and the financial information database 164 is retrieved. In step 172, the customer interacts with the secure web server to select a flight. Through a series of menus or command-line prompts, the customer can view qualifying flight and seat information for the PPT 10, including destination and departure location choices 174, flight date choices 176, flight time choices 178, and seat choices 180. In presenting these choices, the secure web server communicates with a flight information database 182 containing information about flight restrictions associated with the identifier presented by the customer. The secure web server also communicates with one or more CRS databases 184 to retrieve current flight listings from airlines.

As indicated by bi-directional arrows 186, the customer may move between the different types of choices in the process of locating a desirable flight and seat. Each of the choices 174-180 may change when a particular one of the choices 174-180 is specified. For example, if the PPT 10 includes a restricted geographic flight parameter such as distance, than a choice of a destination 174 will affect available choices for a departure location 174. Similarly, a choice of a particular date 176 will affect flight time choices 178 and seat choices 180.

Once a customer is satisfied with all of the geographic and non-geographic flight parameters, the customer selects a date, a flight number, and a seat number, as shown in step 190. This booking information is used to book a flight, as shown in step 192. The booking information is associated with the identifier of the PPT 10 and stored in the flight information database 182. The booking is performed in conjunction with the one or more CRS databases 184, so that the airline on which the flight is booked also has a record thereof. In step 194, the customer gets a booking confirmation ticket, or eTicket 195. In some cases, there may be a delay 196 during which the customer must wait for the eTicket 195. For example, if the eTicket 195 is electronically mailed to the customer, then the customer must wait for the secure web server to compose a suitable e-mail message and convey the eTicket 195 to the customer's e-mail address. As another example, if the eTicket 195 is a printed ticket, then it is specifically contemplated that the eTicket 195 will be mailed to the customer, which will entail a relatively longer delay than the electronic techniques. Once the customer has obtained the eTicket 195, the customer may proceed to step 198 where the eTicket 195 is used to obtain a boarding pass in the same manner as a conventional airline ticket.

Figure 4A:
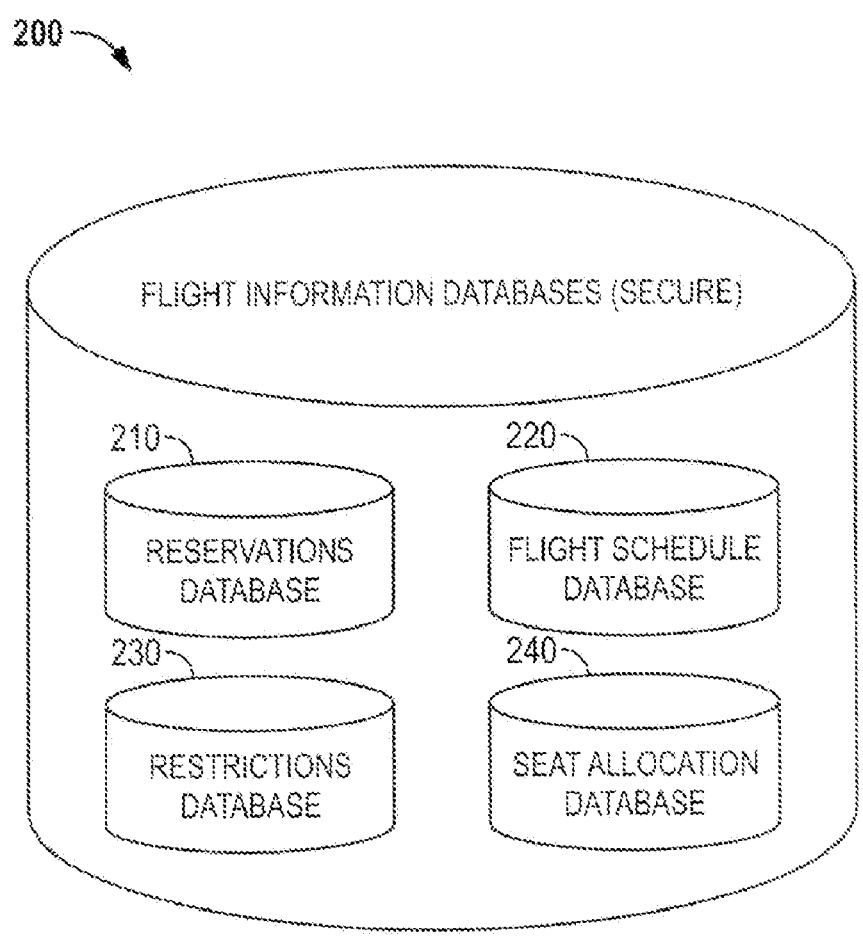
FIG. 4A shows the individual databases belonging to a flight information database.

FIG. 4A shows the individual databases comprising a flight information database 200. All of the databases are relational databases so that information corresponding to a particular identifier, flight, or seat may be readily retrieved. The databases are physically maintained on a web server hard drive, storage area network, redundant array of inexpensive disks, or other mass storage device, and may be arranged and stored using any known database management techniques. The flight information database 200 includes a reservations database 210, a flight schedule database 220, a restrictions database 230, and a seat allocation database 240. The reservations database 210 stores records of actual flight reservations, i.e., bookings made using PPT's 10. The flight schedule database 220 maintains current information on flights offered by commercial airlines, and is updated periodically to reflect schedule changes. The restrictions database 230 contains information about restrictions on each PPT 10, which may be used in conjunction with the flight schedule database 220 to identify qualifying flights for a particular PPT 10. The seat allocation database 240 contains information concerning seat availability for each flight in the flight schedule database 220. Not every seat offered on every flight will be stored here. Airlines may wish to limit the number of seats per flight that will be held open to PPT 10 holders, and this will be reflected in the seat allocation database 240. The seat allocation database 240 is updated frequently, preferably in real-time, since airlines will sell seats independently of PPT 10 sales.

FIG. 5 is an information flow chart 250 describing a customer process of purchasing a pre-paid airline ticket. The information flow chart 250 includes a retail source 252, a customer 254, a PPT server 256, an airline CRS server 258, and a financial transaction server 260. Prior to any purchase, the PPT server 256 periodically exchanges information with one or more airline CRS servers 258 as shown by an arrow 262 and an arrow 264. This exchange serves several purposes, including notifying the PPT server 256 of any scheduling changes by airlines, and notifying the PPT server 256 of any relevant pricing information or the availability of new PPT's and prices. With current information stored on the PPT server 256, the customer may order a PPT, as shown by arrow 266. The PPT server 256 in turn requests financial authorization 268 from the financial transaction server 260, and the financial transaction server 260 returns a message 270 either authorizing or rejecting payment using a payment medium selected by the customer 254. Assuming that the transaction is authorized, the PPT server 256 then completes the transaction and assigns an identifier to the transaction. The identifier is transmitted to the customer 254, as shown by arrow 272. Alternatively, the customer 254 may purchase the PPT 10, preferably the PPT card 60 embodiment thereof, by making a payment 266a for the PPT 10 at the retail source 252. The customer 254 then receives the PPT 10, as indicated by arrow 272a.

Once the customer 254 has obtained the PPT 10, the customer 254 may proceed to book a flight. This process is initiated when the customer checks airline availability 274 by logging on to the PPT server 256 and viewing flight availability as described above in reference to FIG. 4. The PPT server 256 requests current availability information from the airline CRS server 258, as shown by arrow 276. If a seat and flight are available, the airline CRS server 258 responds with an availability acknowledgment, as indicated by arrow 278. This acknowledgment is transferred to the customer 254 by the PPT server 256, as shown by arrow 280. Upon receiving the acknowledgment, the customer 254 then transmits a booking request to the PPT server 256, as shown by arrow 282, and the PPT server 256 forwards the request to the airline CRS server 258, as shown by arrow 284. The airline CRS server 258 responds with a confirmation, as shown by arrow 286. The PPT server 256 then formats the booking confirmation into the eTicket 195, and transmits the eTicket 195 to the customer 254, as shown by arrow 288. If the request can not be filled for any reason, this information is transmitted instead, and the customer must initiate a new booking request, or possibly search for another available seat, i.e., return to checking for availability as shown by arrow 274.

FIG. 6 is a diagram of communication links among components of a system for selling and using pre-paid airline tickets 300. Airline CRS servers 310 communicate with a PPT server 312 either directly, i.e., through a telecommunication voice/data channel 314, or through a connection 315 to a secure network 316. The secure network 316 may be a dedicated network, or a secure Internet connection using, for example, the secure socket layer ("SSL") protocol. The airline CRS servers 310 include an Apollo server 318a, a Sabre server 318b, and other CRS servers 318c-318d, which provide current scheduling and seat availability for commercial airlines. The airline CRS servers 310 can also be configured to provide pricing information to the PPT server 312 as new PPT's become available from the airlines. The PPT server 312 is also in secure communication, through the secure network 316 and connection 319, with one or more financial transaction servers 320 that can authorize transactions using various financial media, such as debit cards, credit cards, or cybercash. The PPT server 312 is also in communication with a PPT web site 322. The PPT web site 322 operates to provide a web interface to the PPT server 312, and to manage physical connections to the Internet 324. It will be appreciated that the PPT server 312 and the PPT web site 322 will typically be present at the same physical site or on the same computer(s), although they are shown here separately for purposes of illustration.

Customers can access the PPT web site 322 and the PPT server 312 through any device having a connection 326 to the Internet 324. It will be appreciated that the Internet comprises numerous data links connected by hosts, gateways, bridges, routers, backbones, and other hardware, and that a communication link between two locations may use any or all of these components. It will be further appreciated that the packet-switched portions of any link operate according to source and destination addresses, rather than according to a particular, specified path through the Internet. A customer generally accesses the Internet through an Internet service provider using an Internet access device, and visits a particular site by entering a Uniform Resource Locator ("URL"). Internet access devices include a mobile computer 328 or a wireless Internet access device 330, as well as computer 332a-332b having a modem, cable modem, network interface card, or other interface to the Internet 324. Other examples of suitable products that are not shown include a television set-top box such as Web-TV, a personal digital assistant such as a Palm Pilot, or a web phone.

The customer may instead wish to contact a traditional travel agent 334, either by telephone or personal visit, and the travel agent 334 can use an Internet connection 326 to access the PPT web site 322. Customer service representatives 336 are also provided to assist customers via a toll-free telephone number. The customer service representatives 336 guide customers through the purchase of a PPT 10, and flight booking using the PPT 10. Each customer service representative 336 has a connection to the PPT server 312, either through an Internet connection 326 to the PPT web site 322, or through a direct data connection 338 to the PPT server 312.

From time to time, a customer will present a PPT 10 to book a flight, and no flights will be available. To ameliorate this problem, the PPT server 312 is configured to accept customer resale requests. That is, customers may, for a nominal fee (less than one dollar), post their PPT's 10, or eTickets 195 (i.e., flight booked with a PPT 10) on an electronic bulletin board maintained by the PPT web site 322. Other customers may browse the PPT's 10 and eTickets 195 on this bulletin board and purchase one of these tickets from the previous owner rather than purchasing a new ticket. The bulletin board may advantageously use the financial transaction server 320 connected to the PPT server 312 to complete the resale.

Figure 7A:
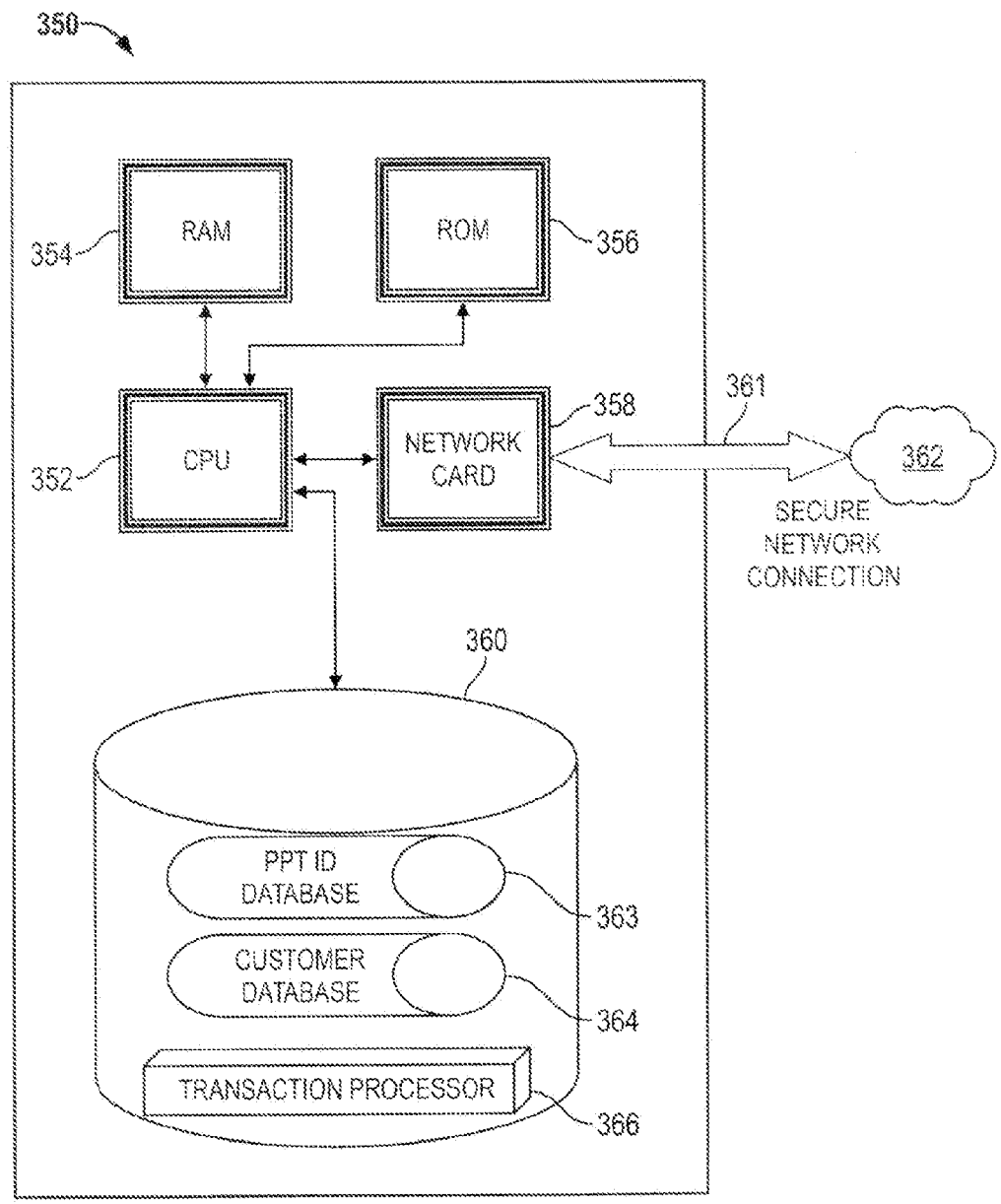
FIG. 7A is a block diagram of a pre-paid airline ticket server.

FIG. 7A is a block diagram of a PPT server 350. The PPT server 350 includes a processor 352, and connected thereto, a random access memory 354, a read-only memory 356, a network card 358, and a storage device 360. The network card 358 can be any network card capable of handling numerous logical connections 361 to a secure network 362, as required by the number of customers, airline CRS's, and financial transaction servers requiring resources from the PPT server 350. The storage device 360 can be any storage device capable of maintaining a PPT identifier database 363 and a customer database 364, such as a hard drive, storage area network, redundant array of inexpensive disks, or other mass storage device. If the databases 363, 364 on the storage device 360 are particularly large, a separate transaction processor 366 may be provided to off-load database management from the processor 352.

The processor 352 and memories 354 may be any processor and memories known in the art that are consistent with the volume of traffic handled by the network card 358, including any associated security protocols, and the volume of data stored in the storage device 360. Suitable network servers are manufactured by Compaq Computers, Dell, IBM, and Sun MicroSystems. Such servers may employ a processor with multiple central processing units, and will operate under control of an operating system such as Unix, Linux or other Unix variants, DOS, Windows or its variants, VMS, and Solaris. The PPT server 350 will also run additional programs or software modules from the operating system to control server operations, web server operations, authentication functions, network security, and database management, many alternatives for which are known in the art and commercially available. The invention may be usefully practiced with any of these computers, operating systems, and other programs. The software modules also permit personalization of the web site provided by the PPT server 350 for each customer, according to customer preferences stored on the storage device 360.

Figure 7B:
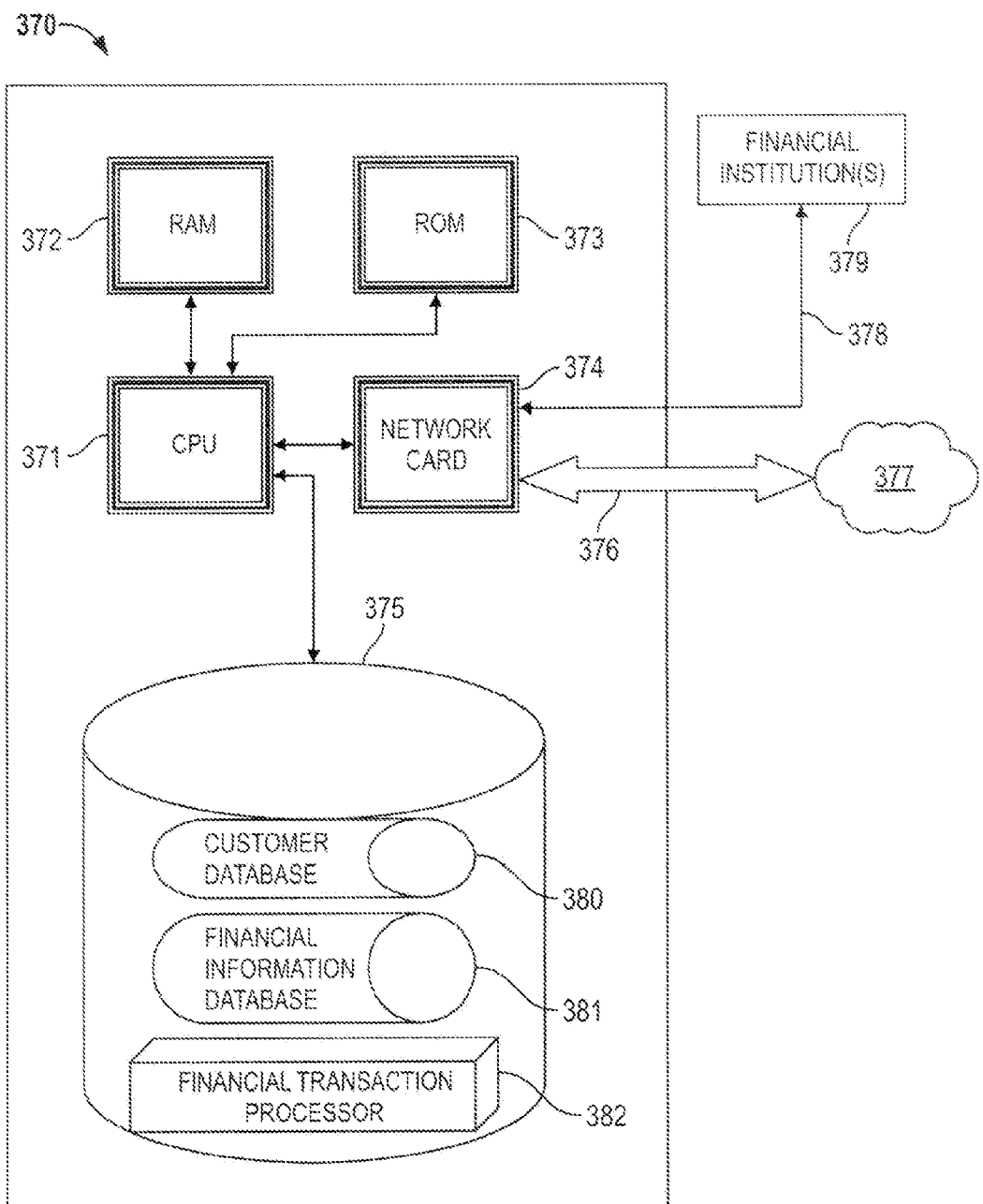
FIG. 7B is a block diagram of a financial transaction server.

FIG. 7B is a block diagram of a financial transaction server 370. The financial transaction server 370 includes a processor 371 and, connected thereto, a random access memory 372, a read-only memory 373, a network card 374, and a storage device 375. These components are similar to those for the PPT server 350, except as noted below. The network card 374 must handle, in addition to a connection 376 to a secure network 377, a second connection 378 to one or more financial institutions 379, which may require dial-in service. Additionally, the storage device 375 is used to store different data, including a customer database 380 and a financial information database 381. The storage device 375 may also include a financial transaction processor 382 to off-load database management functions from the processor 371.

Figure 7C:
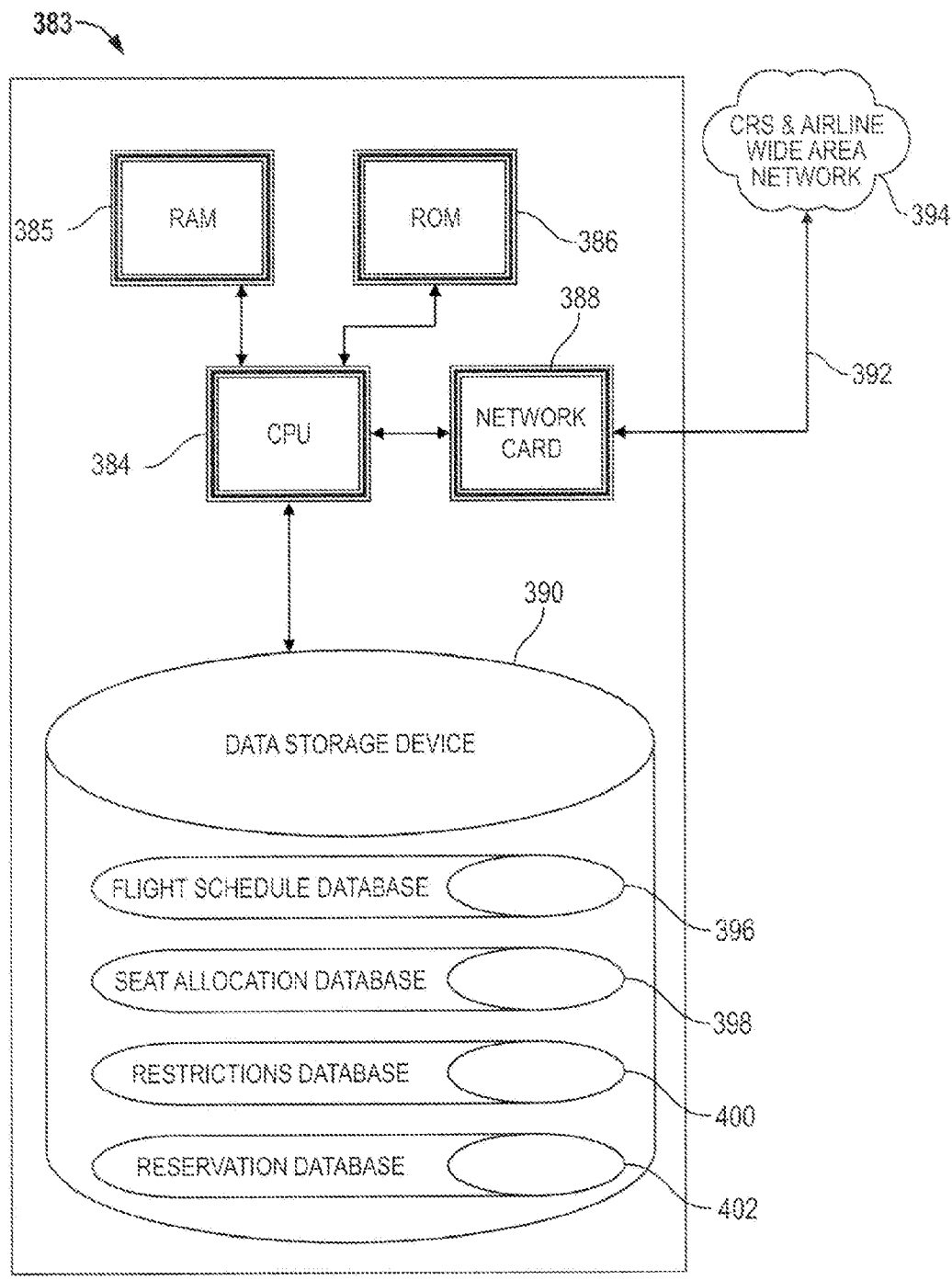
FIG. 7C is a block diagram of an airline central reservation system server.

FIG. 7C is a block diagram of an airline central reservation system server 383. The airline CRS server 383 includes a processor 384, and, connected thereto, a random access memory 385, a read-only memory 386, a network card 388 and a storage device 390. These components are similar to those for the PPT server 350, except as noted below. The network card 388 provides network services, through a secure network connection 392 to a wide area network ("WAN") 394 shared by airlines and CRS's. The WAN 394 may be a virtual private area network operating on the Internet, or may be established through voice/data connections on the public switched telephone network, or may comprise a separate physical network. The WAN 394 may also be some combination of these. The storage device 390 includes a flight schedule database 396, a seat allocation database 398, a restrictions database 400, and a reservation database 402.

The structure of the databases used in connection with the invention will now be described in more detail.

FIG. 8A illustrates records in a PPT identifier database 410 that resides on the PPT server 350. The PPT identifier database 410 includes a plurality of records 412 relating to specific PPT's 10, including a first record 412*a*, a second record 412*b*, a third record 412*c*, and a fourth record 412*d*. Each record has a number of fields, as represented by a horizontal row in FIG. 8A. This includes a region field 414 defining a geographic region or other geographic restriction on possible flights. A PPT identifier field 416 contains the identifier corresponding to a particular PPT 10. An allowed departures field 418 contains any pre-determined airports from which a booked flight using this PPT 10 must depart. An allowed destinations field 420 contains any destinations for which a booked flight using this PPT 10 must be destined. To provide further flexibility in PPT options, the allowed departures field 418 or the allowed destinations field 420 can include a "wild card" symbol, indicating that it has not yet been determined. This is appropriate where, for example, the geographic region field 414 contains a geographic parameter such as distance, as shown in the third record 412*c* in the PPT identifier database 410. This is also appropriate where, for example, the geographic region field 414 only specifies a destination, as shown in the second record 412*b* in the PPT identifier database 410. As should be clear, the region field 414, the allowed departures field 418, and the allowed destinations field 420 collectively correspond to the geographic flight parameters discussed above. Other fields in the PPT identifier database 410 correspond to non-geographic flight parameters.

Participating airlines are recorded in a participating airline field 422. An expiration date field 424 is including, indicating the date on which the PPT 10 expires. The price of the PPT 10 is recorded in a price field 426. Booking details are recorded in a booking details field 428. An issue date is recorded in an issued date field 430, and reflects the date on which the PPT 10 was issued for sale to consumers. A sale date is recorded in a sale date field 432, and reflects the date on which the PPT 10 was purchased by a consumer. The PPT identifier database also includes a customer identification field 434. The value stored in this field is a customer identifier selected by a customer when a flight is booked. This permits subsequent authentication of the PPT 10 by a customer to prevent misappropriation of a booked seat.

The PPT identifier database 410 also includes a restrictions field 435 which contains information concerning flight restrictions on a PPT 10, if any. There may be no restrictions on a particular PPT 10, as shown in the first record 412*a*. There may be seat restrictions on a PPT 10, as shown in the second record 412*b*. The PPT 10 stored in the second record 412*b* is limited to seats 23A-35E. For this PPT 10, the ticketholder cannot book a flight in seats from rows 1-22 and from row 35 to the rear of the plane, which guarantees that other seats on qualifying flights will be open for non-PPT ticketholders. A seat restriction may only refer to row numbers, i.e., 25-35, if the number of seats per row varies across otherwise qualifying flights. Other restrictions are possible, such as a flight time restriction, as shown in record 412*c*, or a date restriction, as shown in record 412*d*. These and other possible restrictions operate to limit the flights available to a PPT holder may, and may be used in establishing the price for each PPT 10.

FIG. 8B illustrates records in a customer database 440 that resides on the PPT server 350. The same customer database 440 may also reside on the financial transaction server 370. The customer database 440 includes a plurality of records 442 relating to specific customers known to the PPT server 350. Each record has a number of fields, as represented by a horizontal row in FIG. 8B. This includes fields for a customer identifier 444, a password 446, a customer name 448, an address 450, a contact telephone number 452, a contact e-mail address 454, a date of purchase 456, an airline preference 458, a seat preference 460, a time preference 470, frequent flyer mile airlines 472 and comments 474. This information is entered by the customer and preserved for use with any current and future PPT's purchased by the customer. The customer identifier 444 is the same as the customer identifier 434 used in the PPT identifier database 410. Any information requiring security, such as the password 446 and the contact telephone number, may be encrypted to provide security for the customer. The airline preference 458, seat preference 460, and time preference 470 may be used by the PPT server 350 to generate recommendations for particular flights. The comments 474 may include any alpha-numeric text.

FIG. 8C illustrates records in a financial information database 480 that resides on the financial transaction server 370. The financial information database 480 includes a plurality of records 482 relating to specific customers known to the PPT server 350. Each record has a number of fields, as represented by a horizontal row in FIG. 8C. This includes fields for a customer identifier 484, a password 486, a customer name 488, a billing address 490, a contact telephone 492, a contact e-mail address 494, a date of purchase 496, a credit card type 498, a credit card number 500, an expiration date 502, a second credit card type 504, a second credit card number 506, a second credit card expiration date 508, and any comments 510. This data is used by the financial transaction server to process financial transactions for identified customers. Some of the information, in particular the first credit card number 500 and the second credit card number 506, is encrypted to prevent unauthorized access to, and use of, the information.

FIG. 8D illustrates records in a reservations database 520 that resides on the airline CRS server 383. The reservation database 520 includes a plurality of records 522 relating to reserved flights known to the airline CRS server 383. Each record has a number of fields, as represented by a horizontal row in FIG. 8D. This includes fields for a flight number 524, a departure/destination airport 526, an airline 528, a class 530, a list price 532, a category price 534, and a passenger name record 536. The category price 534 is the PPT price paid for the particular reservation, if any. By accessing the reservations database 520, through the PPT server 350, the customer can convert a PPT 10 into a conventional reservation, subject to any airline restrictions. The customer's name will then be entered into the corresponding field for the passenger name record 536.

FIG. 8E illustrates records in a flight schedule database 540 that resides on the airline CRS server 383. The flight schedule database 540 includes a plurality of records 542 relating to flights known to the airline CRS server 383. Each record has a number of fields, as represented by a horizontal row in FIG. 8E. This includes fields for a departure airport 544, a destination airport 546, a date 548, a departure time 550, an arrival time 552, an airline 554, a flight number 556, and a via 558. This flight information may be accessed periodically by the PPT server 350 to determine whether there are qualifying flights for a particular PPT 10. Restrictions on a PPT 10, including geographic parameters and other parameters, such as date, time, and airline, may be compared to the flight schedule database 540 in making this determination.

FIG. 8F illustrates records in a seat allocation database 560 that resides on the airline CRS server 383. The seat allocation database 560 includes a plurality of records 562 relating to seat allocation. Each record has a number of fields, as represented by a horizontal row in FIG. 8F. This includes fields for a flight number 564 (to cross-reference other databases), a departure date 566, a number of remaining economy seats 568, a number of remaining business class seats 570, and a total number of seats booked 572. FIG. 8G illustrates records in a restrictions database 580 that resides on the airline CRS server 383. The restrictions database 580 includes a plurality of records 582 relating to flight restrictions, i.e., number of stops. Each record is represented by a horizontal row in FIG. 8G. Each record includes fields for a flight number 584, a departure date 586, an economy flight restriction 588, a business flight restriction 590, and any comments 592. All of the above information is maintained by airlines using the airline CRS server 383, and most may be accessed by the PPT server 350 to assist customers in finding suitable flights within the bounds of any restrictions on a PPT 10.

A web interface operating according to the invention will now be described in more detail.

Figure 9A:
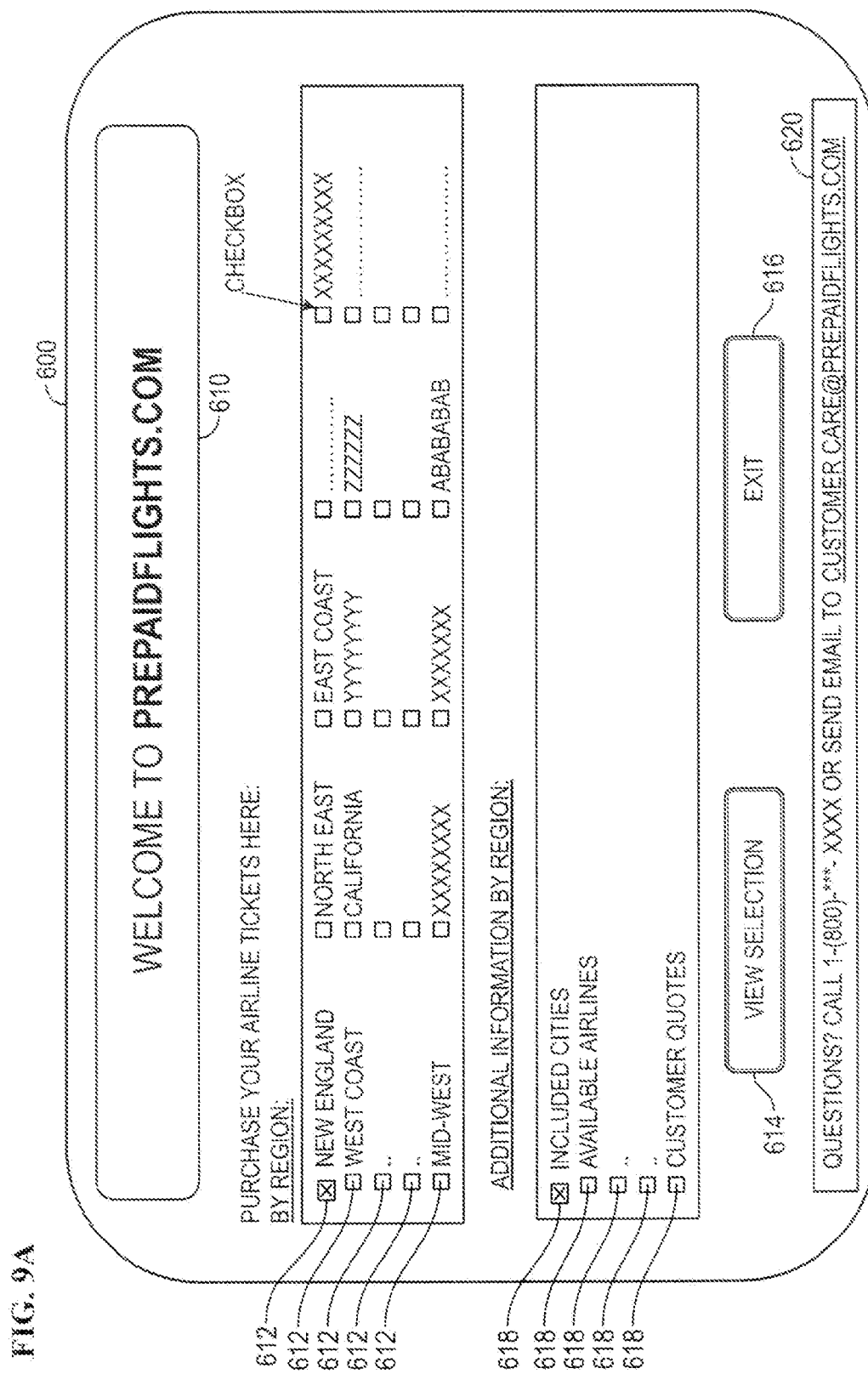
FIG. 9A shows a World Wide Web introduction page.

FIG. 9A shows a web introduction page 600 as displayed on a computer screen (or other network device) by the PPT server 350. The various features of the web site described below may include any known media, including animation, sound, music, graphics, and text. It will be appreciated that such web pages may be generated and interpreted using many known programming languages or mark-up languages, and any associated plug-ins or add-ons, including HTML, SHTML, XML, DHTML, JavaScript, Java, Perl, CGI, C, and C++, all of which may be used to practice the invention. A user may view the web introduction page 600, and the following pages, by entering, or selecting a link to, a URL such as "http://www.prepaidflights.com," with a browser such as Microsoft Explorer or Netscape Navigator, executing on the user's Internet access device. This URL, or "address" will direct the browser to request attention from the PPT server 350, which responds by providing to the browser any mix of the media and code described above.

The web introduction page 600 includes an introductory graphic 610, which is shown as including only words, but may also include colored graphics and animation. The customer may enter geographic region selections into a plurality of checkboxes 612 and activate a view selection button 614 to view available PPT's 10. The customer may alternatively exit the introduction page 600 by activating an exit button 616, which will send the customer back to a previous universal resource locator ("URL") address. The customer may also select additional information for each selected geographical region by using a second plurality of checkboxes 618. Although not shown, other restriction options may be provided on the web introduction page 600, such as particular flight dates, flight times, or flight distances. Additional information is provided in a text box 620 at the bottom of the web introduction page 600.

Figure 9B:
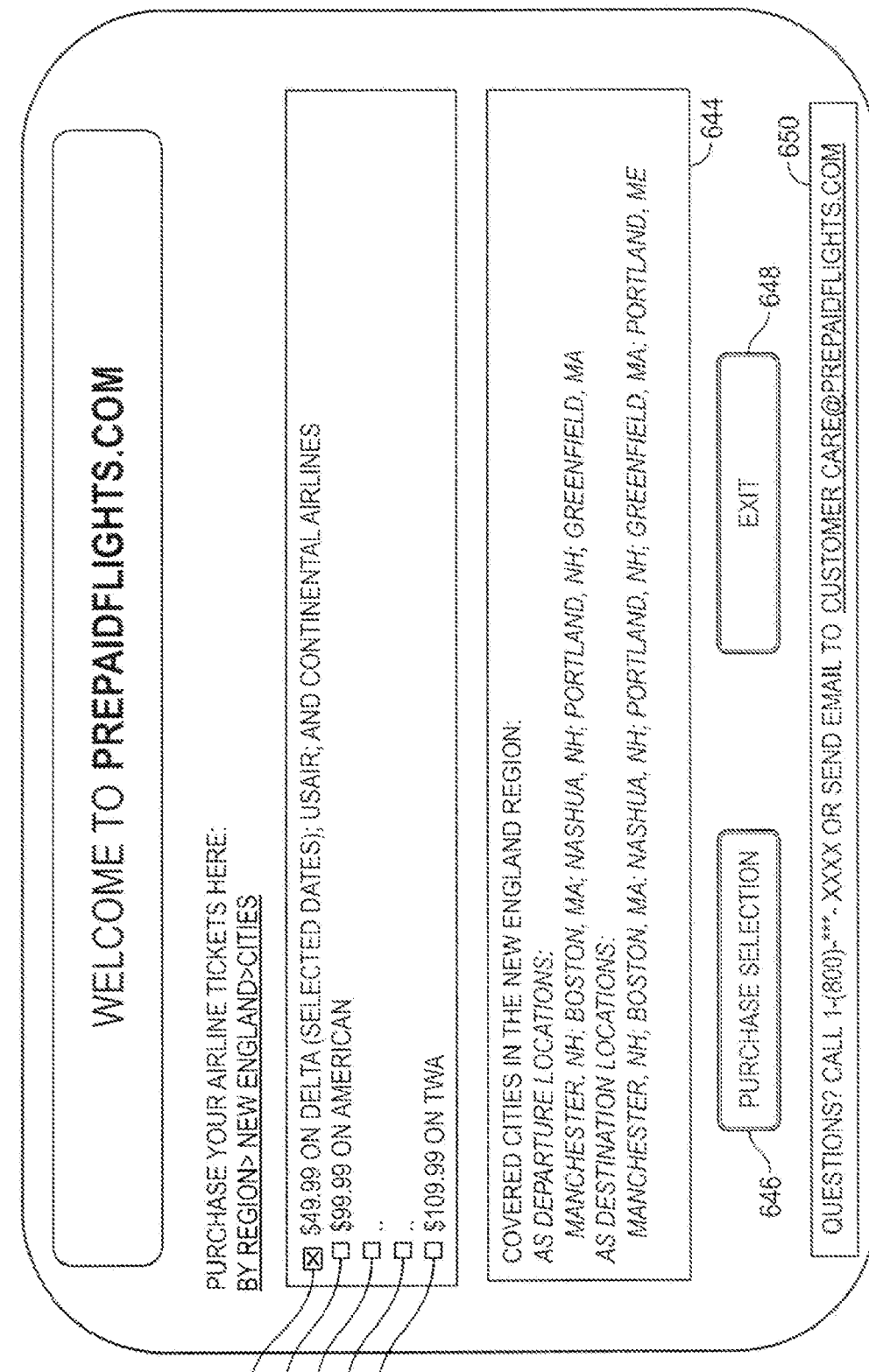
FIG. 9C shows a World Wide Web purchase page.
FIG. 9D shows a World Wide Web confirmation page.

FIG. 9B shows a selection page 640 which presents purchase options to a customer who activates the view selection button 614 from the web introduction page 600. The selection page 640 is similar to the web introduction page 600, with differences as noted below. The selection page 640 includes a plurality of additional checkboxes 642 which provide specific PPT offerings and prices. Additional information concerning the offerings is provided in a text box 644. The customer may select one or more of the plurality of additional checkboxes 642, and activate a purchase selection button 646 to enter a transaction. An exit button 648, when activated, will send the customer back to the web introduction page 600. Additional information is provided in a text box 650 at the bottom of the selection page 640.

Figure 9C:
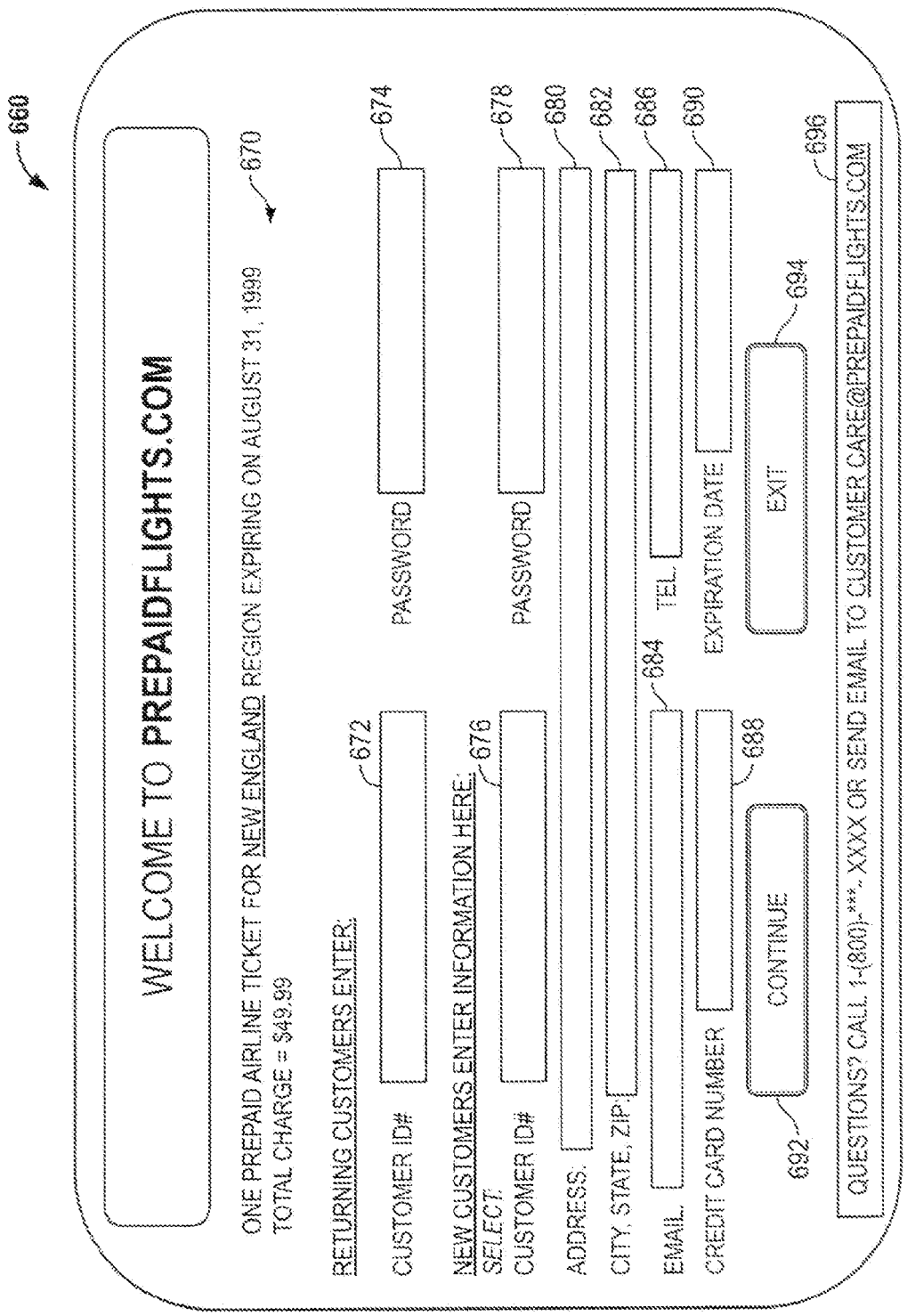

FIG. 9C shows a purchase page 660 which presents payment options to a customer who activates the purchase selection button 646 from the selection page 640. The purchase page 660 is similar to the web introduction page 600, with differences as noted below. The purchase page 660 includes an introduction 670 describing the PPT 10 which the customer is about to purchase. A first customer identifier data entry field 672 and a first customer password entry field 674 permit a customer to purchase the PPT 10 using previously entered financial information stored in the PPT server 350. If the customer is a new customer, then a second customer identifier data entry field 676 and a second password entry field 678 must be filled in instead, along with data entry fields for an address, a city, state and zip code 682, an e-mail address 684, a telephone number 686, a credit card number 688, and an expiration date 690. Once these fields have been completed by the customer and the customer activates a continue button 692, the data contained therein is forwarded to the financial transaction server 370 for confirmation and authorization. The data is also stored in the customer database 380 and the financial information database 381 of the financial transaction server 370 and the PPT server 350 for future use. If the customer instead activates an exit button 694, the customer is returned to the selection page 640. Additional information is provided in a text box 696 at the bottom of the purchase page 660.

Figure 9D:
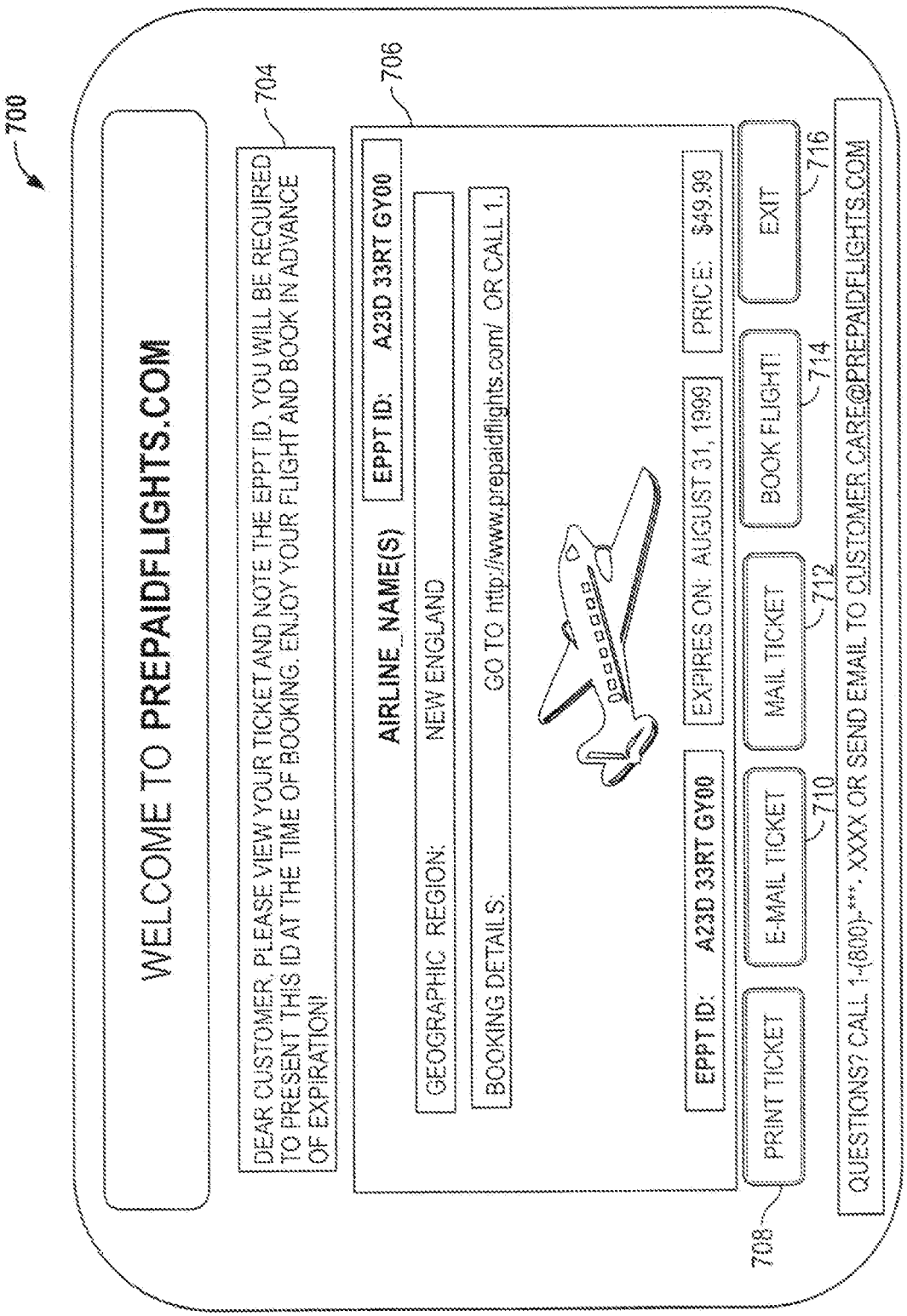

FIG. 9D shows a confirmation page 700 which is presented to a customer who activates the continue button 692 from the purchase page 660. The confirmation page 700 is similar to the web introduction page 600, with differences as noted below. The confirmation page includes a first text box 702 containing any supplemental instructions to the customer. The confirmation page also includes an electronic PPT 706, which is the same as the electronic PPT 80 described in reference to FIG. 2C. The customer may print this ticket directly by activating a print ticket button 708. The customer may instead have the electronic PPT 706 e-mailed, in the form of the e-mail ticket 100 of FIG. 2D by activating an e-mail ticket button 710. Instead, the customer may have the electronic PPT 706 mailed in the form of the printed PPT 30 of FIG. 2A by activating a mail ticket button 712. As still another option, the customer may proceed directly to a flight booking menu (not shown) since the customer and the electronic PPT 706 have already been authenticated for the present session on the PPT server 350. If the customer activates an exit button 716 on the confirmation page 700, the customer will be returned to the web introduction page 600, where a new purchasing session may be commenced.

While the invention has been disclosed in connection with the preferred embodiments 110 shown and described in detail, various modifications and improvements thereon will become readily apparent to those skilled in the art. Accordingly, the spirit and scope of the present invention is to be limited only by the following claims:

The invention claimed is:

1. A pre-paid airline ticketing system comprising:
 a storage device configured to store a record representing a pre-paid, fixed-price option purchased by a customer, the record including:
  (i) a plurality of geographic flight parameters and a plurality of non-geographic flight parameters, at least one of the geographic flight parameters being unspecified and at least one of the non-geographic flight parameters being participating airlines available for selection by the customer for booking a flight; and (ii) an identifier associated with and uniquely identifying the record for the customer to use to exercise the pre-paid, fixed price option; and a processor in communication with said storage device and configured to:

verify an identifier submitted by a customer to exercise the pre-paid, fixed-price option;

retrieve the record including the identifier submitted by the customer;

communicate actual flight information, via a network, to the customer to present actual flights offered by the participating airlines available for selection by the customer based on the geographic and non-geographic flight parameters stored in the record;

receive, from the customer, flight selection information corresponding to one of the presented actual flights; and book the flight selected by the customer from among the presented actual flights by exercising the pre-paid, fixed-price option.

2. The pre-paid airline ticketing system of claim 1 wherein the identifier comprises an alpha-numeric sequence.

3. The pre-paid airline ticketing system of claim 1 wherein the plurality of non-geographic flight parameters include at least two of the following: a date, a time, a flight number, and a seat number.

4. The pre-paid airline ticketing system of claim 1 wherein the plurality of non-geographic flight parameters further comprise one or more unspecified non-geographic flight parameters.

5. The pre-paid airline ticketing system of claim 4 wherein the one or more unspecified non-geographic flight parameters comprise a range of possible values from which the one or more unspecified non-geographic flight parameters may be selected.

6. The pre-paid airline ticketing system of claim 1 wherein the plurality of geographic flight parameters comprise a departure location and a destination location.

7. The pre-paid airline ticketing system of claim 1 further comprising a dependence between two or more of the plurality of geographic flight parameters.

8. The pre-paid airline of claim 7 wherein the dependence comprises a maximum distance between the destination location and the departure location.

9. The pre-paid airline ticketing system of claim 7 wherein the dependence comprises a geographical region from which the departure location and the destination location must be selected.

10. The pre-paid airline ticketing system of claim 7 wherein the dependence comprises a geographical region from which the departure location must be selected for a specified destination location.

11. The pre-paid airline ticketing system of claim 7 wherein the dependence comprises a geographical region from which the destination location must be selected for a specified departure location.

12. The pre-paid airline ticketing system of claim 1 further configured to store data on a machine-readable, tangible medium.

13. The pre-paid airline ticketing system of claim 12 wherein the machine-readable, tangible medium stores an encoded representation of the identifier.

14. The pre-paid airline ticketing system of claim 1 wherein said processor is further configured to generate a printed receipt, the printed receipt including a first part for presentation to an airline and a second part for a customer's records, the printed receipt including, in printed form, the identifier, the plurality of non-geographic flight parameters, and the plurality of geographic flight parameters.

15. The pre-paid airline ticketing system of claim 1 wherein said processor is further configured to issue an electronic receipt including the identifier.

16. The pre-paid airline ticketing system of claim 15 wherein the electronic receipt is an email receipt.

17. The prepaid airline ticketing system according to claim 1, wherein said storage device further stores a database in which the record is stored.

18. The prepaid airline ticketing system according to claim 1, wherein the processor retrieves the record by accessing the database.

19. The prepaid airline ticketing system according to claim 1, wherein the actual flights presented to the customer are presented with scheduled flight times.

* * * * *